(12) United States Patent
Moller

(10) Patent No.: US 6,325,603 B1
(45) Date of Patent: Dec. 4, 2001

(54) CHARGED COOLED ROTARY ENGINE

(75) Inventor: Paul S. Moller, Dixon, CA (US)

(73) Assignee: Moller International, Inc., Davis, CA (US)

( * ) Notice: Subject to any disclaimer, the term of this patent is extended or adjusted under 35 U.S.C. 154(b) by 0 days.

(21) Appl. No.: 09/582,505

(22) PCT Filed: Dec. 17, 1998

(86) PCT No.: PCT/US98/27045

§ 371 Date: Jun. 24, 2000

§ 102(e) Date: Jun. 24, 2000

(87) PCT Pub. No.: WO00/37784

PCT Pub. Date: Jun. 29, 2000

(51) Int. Cl.$^7$ ..................................................... F02B 55/06
(52) U.S. Cl. ................................................. 418/86; 418/94
(58) Field of Search .............................. 123/242; 418/15, 418/86, 61.2

(56) References Cited

U.S. PATENT DOCUMENTS

| | | | | |
|---|---|---|---|---|
| 3,383,936 | * | 5/1968 | Corwin ................................. | 418/61.2 |
| 3,405,694 | * | 10/1968 | Zimmermann et al. ............... | 418/86 |
| 3,456,623 | * | 7/1969 | Weigert et al. ........................ | 418/86 |
| 6,164,942 | * | 12/2000 | Moller ................................... | 418/86 |

FOREIGN PATENT DOCUMENTS

1068611 * 12/1979 (CA) ...................................... 418/86

* cited by examiner

Primary Examiner—Michael Koczo
(74) Attorney, Agent, or Firm—Oppenheimer Wolff and Donnelly LLP; Claude A. S. Hamrick

(57) ABSTRACT

A charge cooled rotary engine includes a housing, a first end plate, and a second end plate. The housing and end plates combine too define a closed chamber. A rotor disposed within the housing includes three flanks, a cylindrical hub, and a web extending transversely from the hub and joining medial portions of the flanks to the hub. The web, flanks, and hub form rotor cavities on opposite ends of the rotor. Inlets formed in the end plates for receiving fuel/air charge terminate in entry ports facing the closed chamber. Distribution chambers, formed in the end plates adjacent the entry ports, are open to the closed chamber. The entry ports directly communicate with the rotor cavities and are isolated from direct communication with any of the intake, compression, and combustion chambers by the rotor flanks. The distribution chambers variously communicate directly with the entry ports via the rotor cavities subject to partial obstruction by the hub and variously communicate directly with the intake chamber subject to obstruction by the rotor flanks. Heat transfer devices are provided in the fuel/air charge, and a novel fluid lubrication means lubricates all bearings and seal.

19 Claims, 18 Drawing Sheets

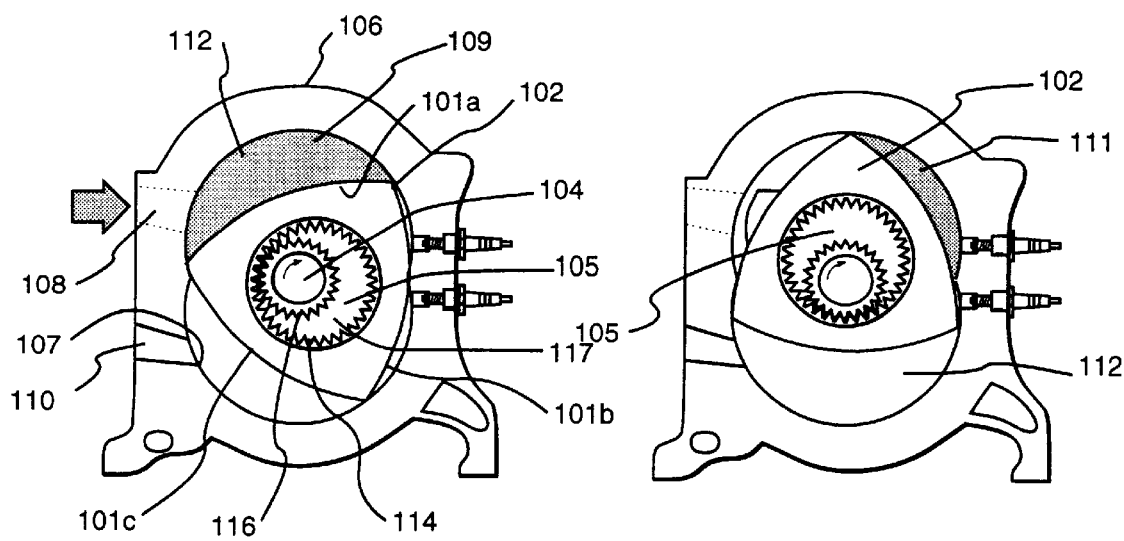
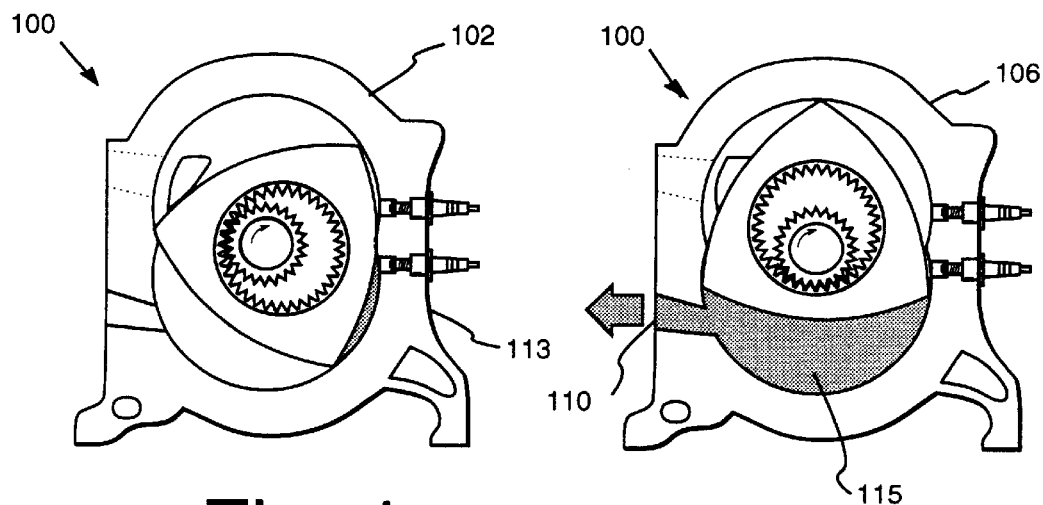
Fig. 1a (PRIOR ART)  Fig. 1b (PRIOR ART)
Fig. 1c (PRIOR ART)  Fig. 1d (PRIOR ART)

CHARGED COOLED ROTARY ENGINE

This application claims the benefit of International Application No. PCT/US98/27045, filed Dec. 17, 1998, designating the United States of America.

BACKGROUND OF THE INVENTION

1. Field of the Invention

The present invention relates generally to rotary engines. More specifically, the present invention relates to an improved rotor and intake charge entry port configuration providing substantially uniform intake charge cooling of a Wankel type rotary engine. Improved heat transfer devices are provided within rotor cavities and a novel seal lubricating arrangement is included.

2. Description of the Prior Art

Wankel type rotary engines are commonly used in many applications including automobiles and other motor vehicles. These engines operate according to a four stroke process having four cycles including intake, compression, expansion, and exhaust. FIGS. 1A through 1D illustrate side views of a typical prior art rotary engine engaged in the four cycles of operation.

As shown in FIGS. 1A through 1D, the engine typically includes a rotor 102 having three flanks forming combustion surfaces 101a, 101b, and 101c located between three apexes, and a crankshaft 104 having an eccentric 105 disposed within a rotor housing 106. Rotor housing 106, which has an inner surface 107 in the shape of a peritrochoid curve, includes an intake port 108 and an exhaust port 110. End plates (not shown) are affixed to ends of rotor housing 106 to form a closed chamber 112.

The rotor 102 engages eccentric 105 of the crankshaft via a rotor bearing (not shown) which typically includes an inner bearing race, an outer bearing race, and a plurality of roller bearings. Rotor 102, which drives crankshaft 104, includes rotor gears 114 which engage crankshaft gears 116 of the crank shaft. The rotor revolves at one third the speed of the crankshaft and fires once per revolution of the crankshaft.

In operation, as rotor 102 rotates, the three combustion surfaces 101i a, 101b, and 101c serve to variously combine with the inner surface of housing 106 to variously define an intake volume, a compression volume, an ignition volume, and an exhaust volume of closed chamber 112.

FIG. 1A depicts in particular the intake cycle during which intake port 108 is open and the rotor surface 101a defines an intake volume 109 of the closed chamber which increases in volume to draw charge there-into from an external source such as a carburetor (not shown). FIG. 1B specifically depicts the engine during the compression cycle in which the compression volume 111 is decreased to compress the charge. FIG. 1C shows at 113 the ignition cycle during which compressed charge is ignited by a spark to provide a force pushing the rotor around as the ignited charge expands. FIG. 1D depicts at 115 the exhaust cycle wherein the contents of the exhaust volume is cleared via exhaust port 10 to prepare the engine for another cycle. Note that as the rotor 102 turns within the housing 106, the rotor surfaces 101b and 101c likewise define intake, compression, combustion, and exhaust cycles.

FIG. 2A shows an exploded perspective view of the prior art engine of FIG. 1A. Rotor 102 includes a central hub 117 having a central axis A, rotor flanks 118, and flank supports 119 extending transverse to the central axis and joining the hub to the flanks. As depicted, the engine further includes a first end plate 122 and a second end plate 124 for attachment to first and second ends of rotor housing 106 to form the closed chamber 112.

Housing 106 includes spark plug holes 126 bored there through to receive spark plugs (not shown) used for ignition. Housing 106 further includes peripheral ports 128 which are open to chamber 112 and allow charge to flow into the chamber as explained further below.

Rotor 102 includes large flow passages 130, located between flank supports 119, which allow charge to flow through the rotor, parallel to crankshaft 104 (FIG. 1A), from first end plate 122 to second end plate 124 as explained further below. Because rotor 102 includes flow passages 130, the rotor lacks structural support material in locations where support could most effectively add strength to the rotor. To compensate and strengthen the rotor, more material must be added to the rotor elsewhere thereby detrimentally increasing its weight. The weight of the rotor is critical because it effects the weight of crankshaft 104 (FIG. 1A), the amount of counter-weight required, the size of the rotor bearing (not shown), and the overall structure of the engine.

First end plate 122 includes a fuel/air inlet 132 which receives charge from an external source (not shown). First end plate 122 also includes a first port 134 formed by a cavity, or slot, on an inner surface 133 of the first end plate and open at various times to flow passages 130 and interior 123 of the rotor 102. First port 134 is in communication with inlet 132 and allows for flow of charge from the external source into flow passages 130 of rotor 102.

Second end plate 124 includes a distribution chamber 135 formed by a cavity in an inner surface 137 of the second end plate and open to chamber 112. Distribution chamber 135 has a side port 136 defined by the edges of distribution chamber 135 and a dashed line 141. Side port 136 communicates with closed chamber 112 subject to obstruction by rotor 102. The remaining portion of distribution chamber 135, excluding side port 136, is identical to first port 134 and communicates with flow passages 130, interior 123 of rotor 102, and passage 152. Second end plate 124 does not include a fuel/air inlet. Side port 136 receives the charge from the first port 134 of the first end plate via flow passages 130 of the rotor and distribution chamber 135. Distribution chamber 135 is in communication with a port outlet 138 formed on the inner surface of a flange of the second end plate. Outlet 138 provides passage of charged air from distribution chamber 135 to a peripheral port inlet 140 of rotor housing 106 when second end plate 124 is affixed to rotor housing 106.

In the depicted engine, intake charge is received solely via fuel/air inlet 132 of the first end plate 122. The engine therefore uses a single entry port configuration in which cooling charge enters the engine from an external source via one side of the engine only. The port configuration is formed essentially by inlet 132, first port 134, flow passages 130 of the rotor, distribution chamber 135, side port 136, side port outlet 138, peripheral port inlet 140, and peripheral ports 128. The exact flow path of charge through the port configuration of the engine varies with the position and rotational speed of rotor 102. Flow paths 142, 144, and 146 illustrate the flow of charge through the engine.

According to flow path 142, charge flows: (1) from an external source (not shown) through fuel/air inlet 132 of first end-housing 122 to first port 134; (2) through flow passages 130 of the rotor parallel to crankshaft 104 (FIG. 1A); (3) to distribution chamber 135 of the second end plate; and (4)

into closed chamber 112 via flow path 144 and/or flow path 146. Charge flows from side port 136 directly into chamber 112 subject to partial obstruction by rotor 102. Charge also flows from distribution chamber 135 along another path 146 into closed chamber 112 via passage 152, side port outlet 138, peripheral port inlet 140, and peripheral ports 128.

Because charge enters the engine through first end plate 122 only, via first port 134 and flows through rotor 102, the side of the rotor adjacent end plate 122 forms a charge entering end of the rotor. Also, because cooling charge does not enter side port 136 directly from an external source, the second end plate is referred to as a charge exiting side of the rotor. As the charge is passed through flow passages 130 of the rotor, via flow path 142, it absorbs heat and its cooling ability is diminished on the exiting side of the rotor. Thus, the rotor temperature at the exiting side of the engine, adjacent second end plate 124, could be as much as 100° F hotter than the temperature at the entering side of the rotor adjacent first end plate 122.

FIG. 2B shows an axial cross sectional view of the prior art engine taken through the peripheral ports 128. Rotor 102 includes side seals 149 extending from rotor flanks 118 for sealing the sides of the rotor to inner walls of the first and second end plates 122 and 124. A passage 150, formed in first end plate 122, provides for communication between fuel/air inlet 132 and first port 134. First port 134 communicates directly with flow passages 130 of rotor 102 and is isolated from direct exposure to chamber 112 by the flanks and side seals of rotor 102. A passage 152, formed in second end plate 124, provides a communicating path between distribution chamber 135 and side port outlet 138 and a passageway 154, formed in housing 106, connects inlet 140 and peripheral ports 128. According to charge flow path 144, charge flows from side port 136 directly into closed chamber 112. According to charge flow path 146, charge flows from distribution chamber 135 into closed chamber 112 via passages 152 and 154.

As mentioned, eccentric 117 of crank shaft 104 is rotatably coupled to rotor 102 via a rotor bearing 158 which typically includes a plurality of roller bearing members secured between an inner bearing race and an outer bearing race. The bearing 158 in this type of prior art charge cooled engine does not run in oil and therefore must use a roller bearing as distinct from a hydro-dynamically supported bearing.

If one side of rotor 102 is even slightly hotter than the opposite side (as little as 10° F.), the bearing race of the bearing 158 on the hotter side of the rotor will be slightly larger due to the thermal expansion differential across the bearing. Because the temperature at the exiting side of the depicted engine, adjacent second end plate 124, could actually be as much as 100° F. hotter than at the entering side of the engine adjacent first end plate 122, the bearing race will be caused to taper axially and cause end-loading of the bearing rollers that will greatly reduce the load-carrying capacity and life of bearing 158. In addition, this coning effect will cause the rotor to thrust to one side and substantially increase the friction and wear on rotor 102 and particularly on side seals 149 of the rotor. The side thrust can also result in side gouging of the inner walls 133 and 137 of the end plates 122 and 124 (FIG. 2A) of housing 106. The coning effect also limits maximum rotational speed of the rotor under high compression loads.

Moreover, in the prior art engine, the quick passage of charge across rotor 102 provides limited opportunity for overall cooling of the rotor. Therefore, the temperature of rotor bearing 158 may reach as high as 400° F., the point at which lubrication begins to fail and metallurgical change (grain growth) begins to occur in the bearing material. Intake charge may also pass through rotor 102 during only a portion of the intake cycle and thus, because the engine may starve for part of the intake cycle, it may be necessary to provide an additional charge flow path by passing charge through eccentric 105 of crankshaft 104. In so doing, one side of eccentric 105 may be cooled more than the other side. This effect causes an additional asymmetric cooling problem in addition to reducing the amount of charge available for overall cooling of the rotor.

Furthermore, the absence of an efficient support structure in this cross-flow arrangement leads to placement of much of the structural support of rotor 102 between the rotor face and the bearing at a point where they are in close proximity. This allows a large heat flux to accumulate at a point where there is little surface area to disperse the heat.

Historically, all two stroke engines and rotary engines have injected oil into the air stream as a means of lubricating the rings or seals. In particular, all charge cooled rotary engines have lubricated the seals entirely by either injecting lubricating oil into the air stream or mixing oil with the fuel which has the same result.

When oil enters the air stream, it becomes problematic whether much of it actually serves to lubricate the engine. For the most part, the oil remains suspended in the charge and is partially burned along with the gasoline. It is a major source of exhaust burned and unburned particulates in a two-stroke engine operation.

Practical two stroke engines must inject oil into the air stream. Subsequently, this oil becomes particulates which have recently been established as carcinogenic and mutagenic. Moreover, unlike gasoline which, given time, does not leave the water to enter the air, those oil particulates that do not remain suspended, enter the water and remain where they can do the most environmental damage. Even if the two stroke engine becomes very fuel efficient, though that is unlikely, this problem will remain a fundamental part of any reasonably priced two stroke engine. Existing four stroke rotary engines, such as those manufactured by Mazda, OMC, RPI, and Norton all inject oil into the air stream (generally lower quantities than two-strokes). Four stroke piston engines do not inject oil but are impractical candidates for use in the weight and volume-sensitive recreational vehicles, hybrid automobiles and portable power plants.

Burtis (U.S. Pat. No. 5,203,307) discloses a rotary engine including an improved oil lubricating system for lubricating apex seals of a rotor. The lubricating system described by Burtis contrasts with prior conventional methods of lubricating apex seals by injecting oil into the air intake using a separate oil pump system. Such conventional systems resulted in poor lubrication results, carbon formation on the rotor face and engine housing, and increased pollution from oil combustion in the combustion chamber.

The oil lubricating system disclosed in Burtis includes: an axial crankshaft passageway formed in a crankshaft into which oil flows; a lobe passageway formed in the lobe, or eccentric, of the shaft in communication at one end thereof with the crankshaft passageway and at the other end thereof with a rotor roller bearing; and a rotor passageway extending through the rotor to the apex of the rotor. During operation of the engine system, oil flows through the crankshaft passageway into the lobe passageway and to the rotor roller bearing to lubricate the roller bearing. Oil then flows from the roller bearing flows through an open race and into the rotor oil passageway to lubricate apex seals disposed at the apexes of the rotor. A small amount of oil flows through the passageway to lubricate the apex seals from the inside of the rotor.

One problem with the rotary engine described by Burtis is that lubrication is not efficiently provided to side seals of the rotor. Another problem with the rotary engine described by Burtis is that oil is not evenly distributed from the rotor passageway, that is from the apex of the rotor, to the interior wall of the rotor housing because, fuel/air charge is injected into the rotor housing from one side only, and therefore, there is an unbalanced flow of charge forcing the lubricant to flow unevenly.

Still another problem with conventional rotary engines relates to the ability of the engine to transfer heat away from the engine parts subjected to the highest temperatures, such as the apex seals, side seals, and rotor bearing structure. Charge-cooled rotary engines have historically been limited in power output by a need to transfer sufficient heat away from the apex seals while not transferring too much heat into the rotor bearing. This delicate balance has required designers of rotary engines to operate within narrow boundaries of RPM and horse power (HP). Because heat transfer is a function of rotor RPM and air-flow, it is not possible to operate a typical charge-cooled engine at substantial power when operating at low RPM where intake air flow is also lower.

What is needed is a means for providing sufficient and uniform charge cooling in a rotary engine on both sides of the rotor in order to substantially reduce problems associated with asymmetric cooling, including end loading of rotor bearings, side thrusting of the rotor, and the need to pass charge through the eccentric. Further needed is a charge cooled rotary engine having a rotor of reduced weight and uncompromised strength.

Another need exists for a means for providing effective and even lubrication of the seals and rubbing surfaces of the engine without requiring that substantial amounts of lubricant enter the charge flow stream as it passes through the engine.

Further needed is a rotary engine having improved heat transfer characteristics.

SUMMARY OF THE INVENTION

It is therefore an object of the present invention to provide a rotary engine design having substantially uniform charge cooling along its axial direction, particularly with respect to opposite ends of the rotor, in order to extend the life of rotor bearings and substantially reduce side thrusting of the rotor.

A further object of the present invention is to provide an engine having a rotor which is lighter than prior art rotors of the same general geometry thereby reducing the overall weight of the engine.

A further object is to provide an engine having an improved lubricating system that eliminates the need to premix fuel and oil or inject oil into the charge flow stream to lubricate the rings and seals, the lubricating system providing efficient and even lubrication of side seals and apex seals.

Yet another object of the present invention is to provide an engine design having means for transferring an optimum amount of heat from the apex seals without overheating the rotor bearing.

Briefly, a presently preferred embodiment of the present invention includes a charge cooled rotary engine having a housing with an inner wall of a peritrochoidal configuration, a first end plate secured to one end of the housing, and a second end plate secured to the opposite end of the housing to define a closed chamber. An elongated shaft extends through the closed chamber and has an eccentric disposed there within. A rotor including three flanks forming a generally trochoidal shape, a cylindrical hub, and a web extending transversely relative to the hub and joining medial portions of the flanks to the hub is disposed within the chamber and is engaged by the eccentric. The web, flanks, and hub form rotor cavities on opposite ends of the rotor and the rotor flanks serve to variously combine with the interior walls of the housing to define intake, compression, and combustion chambers. A first inlet, formed in the first end plate for receiving fuel/air charge, terminates in a first entry port facing the closed chamber. A second inlet, formed in the second end plate for receiving fuel/air charge, terminates in a second entry port facing the closed chamber. A first distribution chamber, formed in the first end plate proximate the first entry port, is open to the closed chamber and a similar second distribution chamber, formed in the second end plate proximate the second entry port, is also open to the closed chamber. The entry ports are positioned to directly communicate with the rotor cavities and to be isolated from direct communication with any of the intake, compression, and combustion chambers by the rotor flanks. The first and second distribution chambers are positioned to variously communicate directly with the entry ports via the rotor cavities subject to partial obstruction by the hub and to variously communicate directly with the intake chamber subject to obstruction by the rotor flanks.

The drive shaft has an axially extending cavity formed therein extending from a first point proximate one end to a second point proximate the opposite end of the shaft. The cavity has a generally circular cross section which is tapered from the first and second ends of the shaft to the center of the eccentric at which the cross section of the cavity is largest.

In an alternative embodiment, the shaft has a plurality of passageways formed therein for receiving lubricant into the cavity from a source external to the cavity; and for passing the lubricant from the cavity to the rotor bearing structure. As the rotor rotates, centrifugal force causes the lubrication to flow from the cavity into the rotor bearing structure, from the rotor bearing structure along the rotor hub to the first and second end plates, to the side seals, along the side seal slots and into the apex slots, and thence onto the apex seals.

Heat transfer assemblies are disposed within the rotor cavities for transferring heat from the rotor to the charge flowing into and out of the rotor cavities. The first and second entry/distribution ports provide a substantially balanced flow of the fuel/air charge into and out of the cavities on each side of the rotor immediately prior to its entry into the combustion chamber. The charge flowing through the rotor cavities passes through the heat transfer assemblies such that heat transferred to the assemblies from the rotor is in turn transferred to the charge. The web includes at least one opening extending therethrough for equalizing charge pressure in the rotor cavities.

An advantage of the present invention is that fuel/air charge flows into the rotor cavities via the first and second entry ports to provide efficient and equal cooling to both ends of the rotor before flowing to the intake chamber via the distribution chambers.

Another advantage is that the symmetric cooling of the rotor substantially eliminates prior art problems including end loading of rotor bearings, side thrusting of the rotor, and the need to pass charge through the eccentric.

A further advantage is that a rotor formed according to the present invention has reduced weight and uncompromised strength thereby reducing the overall weight of the rotary engine.

Another advantage of the present invention is that the improved lubricating system eliminates the need to premix fuel and oil or inject oil into the charge flow stream, yet provides efficient and even lubrication of all bearings as well as the side seals and apex seals.

A still further advantage is that the heat transfer assemblies disposed in the rotor cavities provide optimal transfer of heat from the apex seals and the rotor bearing.

Yet another advantage is the provision of means to minimize the temperature gradient along the surfaces of each of the flanks and thus provide a substantially uniform temperature along the surfaces thereof decreasing the thermally induced stress on the rotor during operation and thereby increasing the life of the rotor.

The foregoing and other objects, features, and advantages of the present invention will be apparent from the following detailed description of the preferred embodiment which makes reference to the several figures of the drawing.

IN THE DRAWING

FIGS. 1A through 1D illustrate operation of a typical prior art rotary engine operating in four cycles of a four stroke process;

DETAILED DESCRIPTION OF THE PREFERRED EMBODIMENTS

Figure 2A:
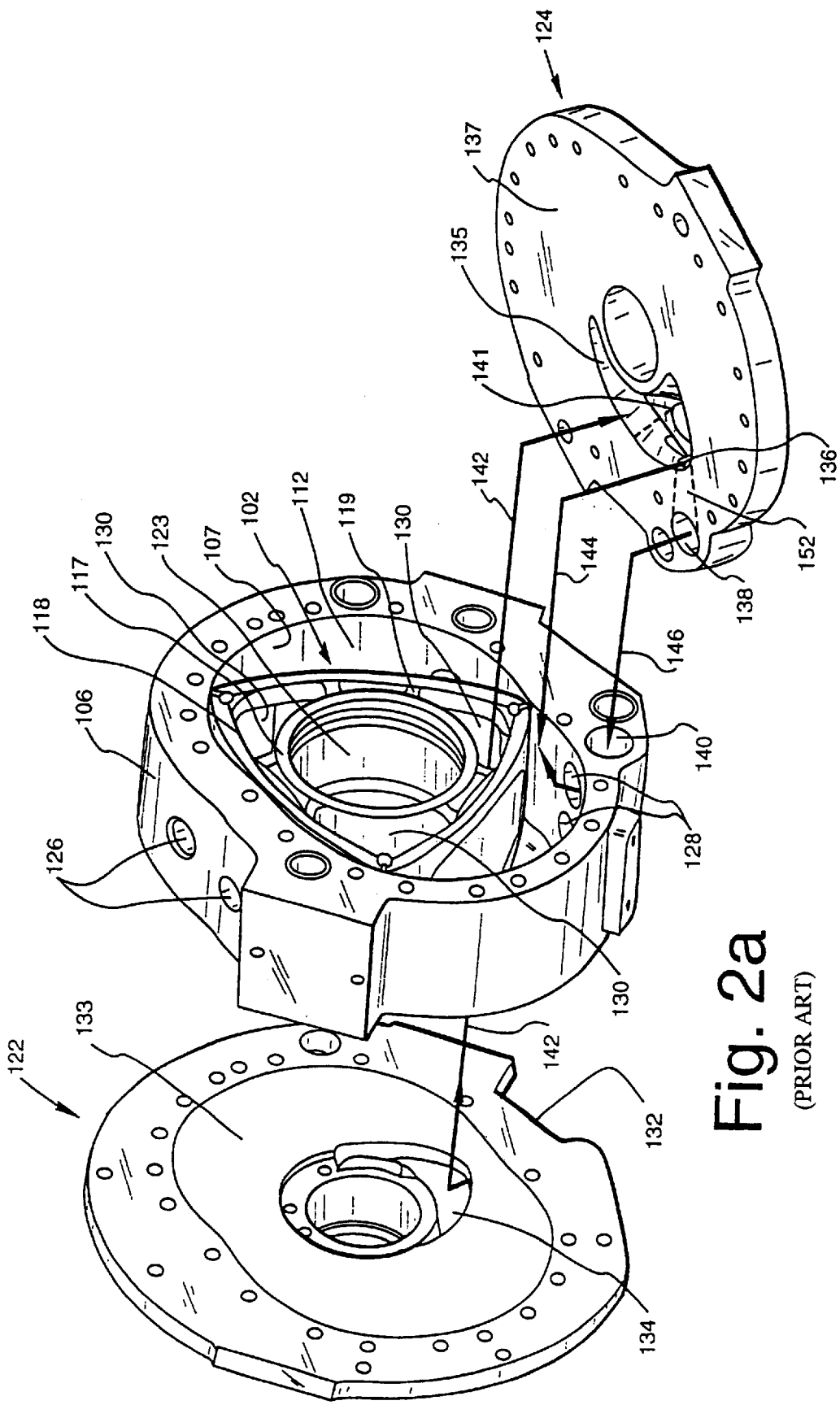
FIG. 2A is an exploded perspective view of a prior art charge cooled engine.
Figure 2B:
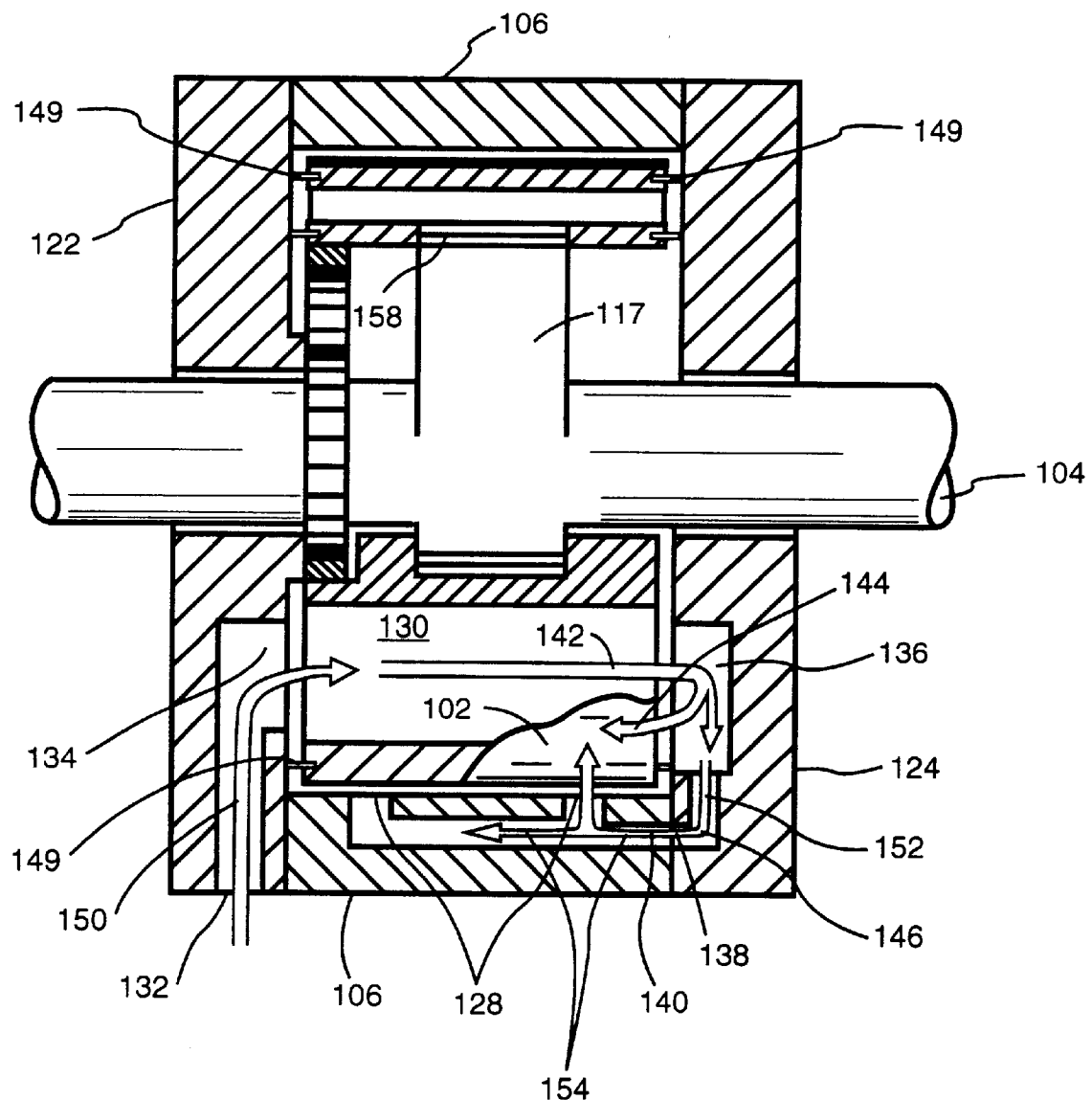
FIG. 2B is an axial cross sectional view of the engine of FIG. 2A.
Figure 3:
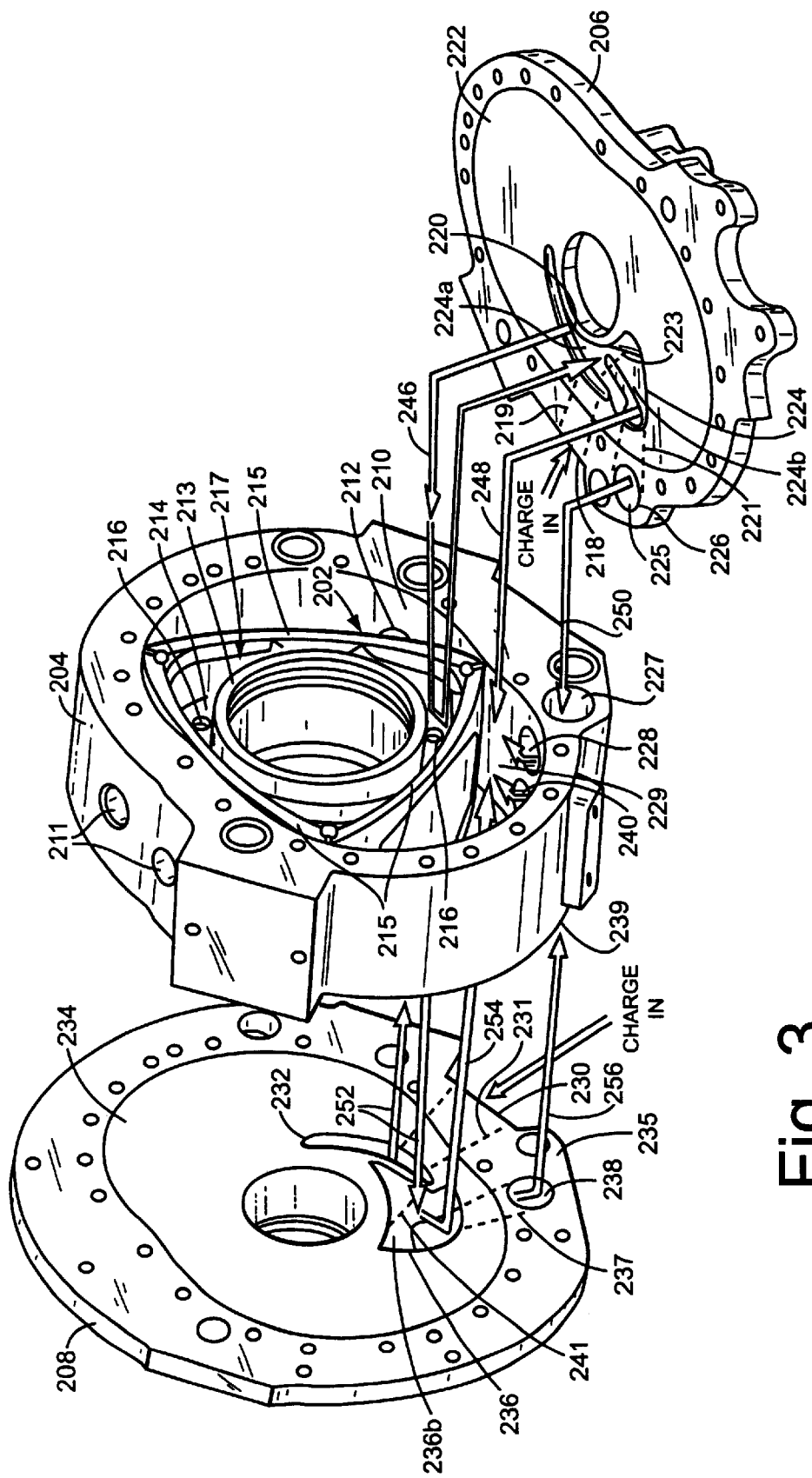
FIG. 3 is an exploded perspective view of a charge cooled rotary engine according to the present invention.

Referring now to the drawing, FIG. 3 illustrates an exploded perspective view of a charge cooled rotary engine according to the present invention. The engine includes a rotor 202 mounted to rotate within a rotor housing 204, a first end plate 206, and a second end plate 208. The end plates 206, 208 are adapted to attach to opposite ends of rotor housing 204 to form a closed chamber 210. The interior wall of the rotor housing is of a peritrochoidal configuration.

Rotor 202 includes a cylindrical hub 213, a web 214, and three rotor flanks 215 forming a generally trochoidal shape. Rotor 202 has a generally I-beam cross sectional configuration and, in a preferred embodiment, is formed using a casting process. The I-beam cross section is defined by the hub as the base flange, the flank as the top flange, and the web 214 as the I-beam web. The web 214 extends transversely from the hub and joins medial portions of the rotor flanks to the hub. A rotor cavity 217 is formed on each end of rotor 202 by hub 213, web 214, and rotor flanks 215. A plurality of through holes 216 are formed in web 214 as part of the casting process to both lighten the rotor and achieve substantially equal pressure in the rotor cavities 217 and along the length of the rotor.

As a result of the I-beam configuration and holes 216, rotor 202 is 15% lighter than prior art rotors of the same general geometry and size. This reduced weight in part results in 40% longer bearing life for rotor bearings (not shown) which support the rotor, as further described below, and because the weight of a rotor is about 10% of the weight of the engine, and since the total weight of a counter-weight (not shown) and other structural components of the engine increases at about twice the weight of the rotor, the overall weight saving in the engine of the present invention is about 5% as a direct result of the I-beam rotor configuration.

As rotor 202 is rotated, rotor flanks 215 serve to variously combine with housing 204 to define an intake volume, a compression volume, an ignition volume, and an exhaust volume of the chamber 210 during respective intake cycles, compression cycles, ignition cycles, and exhaust cycles. Holes 211 bored through rotor housing 204 accommodate spark plugs that cause ignition of a fuel/air mixture, called charge, in the combustion volume. An exhaust port 212 formed in rotor housing 204 provides an exit path for exhaust from the exhaust volume.

The depicted engine has a balanced cooling port configuration in accordance with the present invention which provides substantially uniform charge cooling along the engine axis and on both ends of rotor 202. End plate 206 includes a first fuel/air inlet 218 in its lower outer perimeter for receiving charge from an external source (not shown) such as a carburetor. End plate 206 also includes: a first entry port 220 open to the chamber 210 and formed by a slot, or cavity, in the interior surface 222 of the first end plate; and a first distribution chamber 224, formed by another slot in the interior surface of the first end plate, for receiving and distributing charge. First distribution chamber 224 includes a first inlet portion 224a, which is isolated from direct exposure to chamber 210 by flanks 215 of rotor 202, and a side port portion 224b, or side port 224b, which is variously exposed to chamber 210 for distributing charge thereto. For purposes of illustration, the first and second portions 224a and 224b of the first distribution chamber 224 are shown divided by a dashed line 223. End plate 206 further includes a first peripheral communication port 226 formed by a bore in the interior surface of a flange 225 of the first end plate.

A first passageway shown by dashed lines 219 connects first entry port 220 with fuel/air inlet 218. A second passageway 221 connects distribution chamber 224 with port 226 which lines up with a first peripheral port inlet 227 formed in rotor housing 204 when end plate 206 is affixed to rotor housing 204 as will be shown and described below. Inlet 227 is in communication with a first peripheral port 228 formed in the interior wall 229 of housing 204 and open to chamber 210.

Second end plate 208 includes a second fuel/air inlet 230 in its outer perimeter for receiving charge from an external source (not shown). End plate 208 also includes: a second entry port 232 open to chamber 210 and formed by a slot in the interior surface 234 of plate 208; and a second distribution chamber 236, formed by another slot in the interior surface of the second end plate 208, for receiving and distributing charge. Second distribution chamber 236 includes a first inlet portion 236a, which is isolated from direct exposure to chamber 210 by flanks 215 of rotor 202, and a second side port portion 236b, or side port 236b, which is variously exposed to chamber 210 for distributing charge thereto. For purposes of illustration, the first and second portions 236a and 236b of the second distribution chamber are shown divided by a dashed line 241. End plate 208 further includes a second peripheral communication port 238 formed by a bore in the interior surface of a flange 235 of end plate 208. Fuel/air inlet 230 is connected with second entry port 232 by a passageway 231, and distribution chamber 236 is connected with second peripheral communication port 238 by a passageway 237. Bore 238 lines up with a second peripheral port inlet (not shown) formed in rotor housing 204 when second end plate 208 is affixed to the rotor housing. The second peripheral port inlet is communicatively connected by an internal passageway (not shown) with a second peripheral port 240 formed in interior wall 229 of housing 204 and open to the closed chamber 210.

In accordance with the present invention, charge cooling is achieved by passing charge through the illustrated balanced port configuration and along the paths indicated by the arrows 246, 248, 250, 252, 254, and 256 which pass through fuel/air inlets 218, 230, entry ports 220, 232, distribution chambers 224, 236, peripheral ports 228, 240, and communication passages associated with each of these ports as further described below. The I-beam shape of rotor 202 is adapted to operate in unison with the balanced cooling port configuration to achieve substantially uniform charge cooling of the engine on both ends of the rotor. Charge flows variously through the balanced cooling port configuration based on dynamic parameters of the rotor.

Dynamic parameters of rotor 202 include position and rotational speed and exerted load on the rotor. Depending on the instantaneous values of the dynamic parameters, charge flows through the engine along the several paths at varying rates. In operation, there is approximately zero flow of charge through web holes 216 of the rotor because approximately equal pressure will be developed on both ends of the rotor. Therefore, charge does not flow through the rotor from one end of the engine to the other. Charge flows from entry ports 220 and 232 opposite each end of the rotor into the rotor cavities and is then directed back toward the end plates 206 and 208 where it enters the distribution chambers 224 and 236 subject to obstruction by components in the interior of the rotor as further explained below.

As suggested above, flow paths 246, 248, and 250 illustrate the flow of cooling charge throughout one end of the engine. According to flow path indicator 246, charge may flow: (1) from an external source (not shown) through first fuel/air inlet 218 and passageway 219 and out of entry port 220; (2) to rotor cavity 217; (3) to distribution chamber 224; and (4) directly to chamber 210 via flow path 248 through side port 224b and/or indirectly to chamber 210 through passageway 221, flow path 250, bore 227 and port 228.

Flow paths 252, 254, and 256 illustrate the flow of charge through the opposite end of the engine. In passing along flow path 252, charge flows: (1) from an external source (not shown) through fuel/air inlet 230 and passageway 231 to entry port 232; (2) to and from rotor cavity 217 via path 252; (3) to distribution chamber 236; and (4) to chamber 210 via flow path 254 and/or flow path 256. Charge flows from side port 236b directly to chamber 210, and via flow path 256, charge flows from distribution chamber 236 through passageway 237 to chamber 210 through peripheral port 240 via passages further described below.

Figure 4:
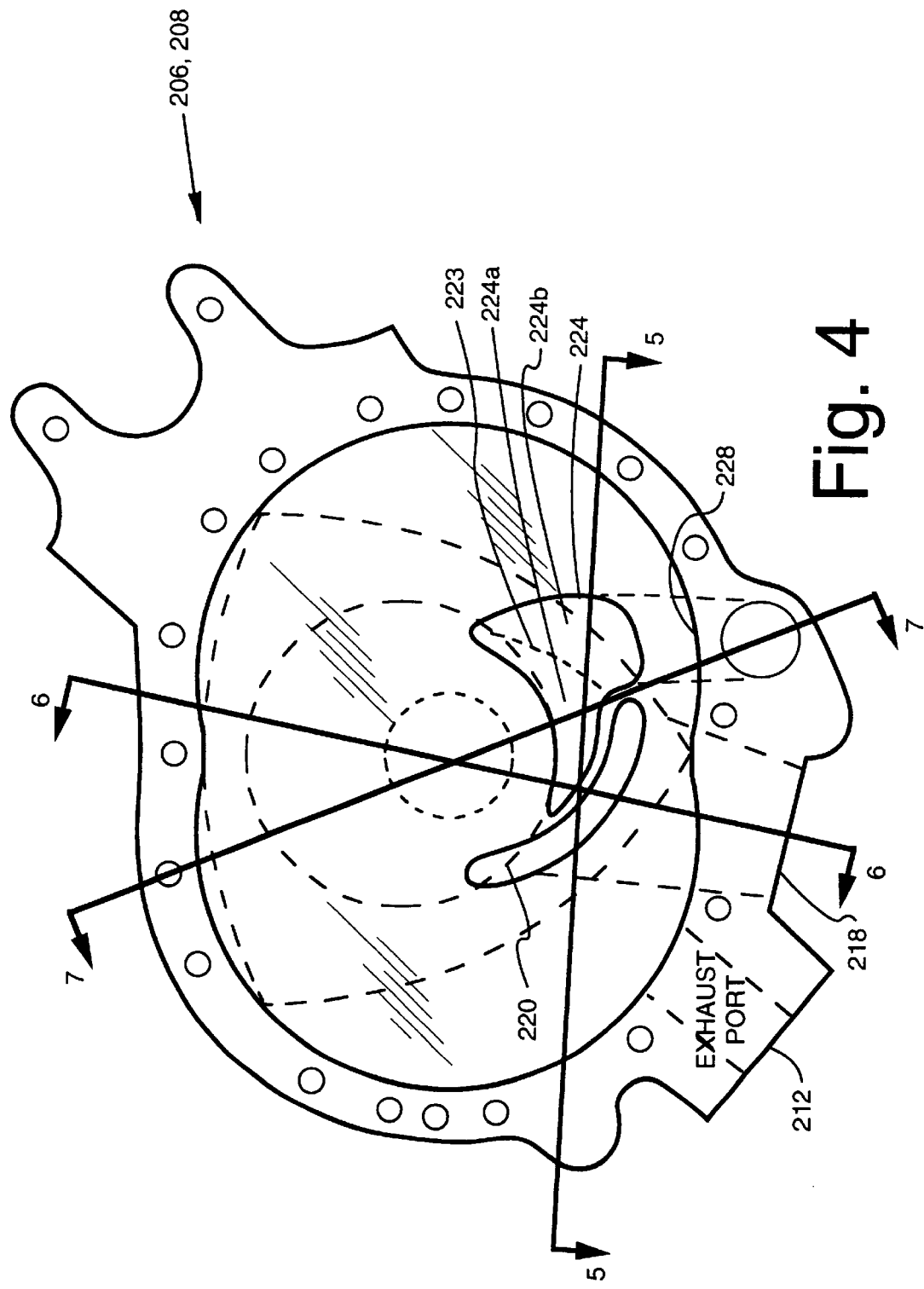
FIG. 4 is a side elevational view of an end plate of the engine of FIG. 3.

FIG. 4 is a side view of the open side of end plate 206. The geometric characteristics of the first end plate and the second end plate are equal and opposite to each other. The geometric characteristics of the entry port 220 and side port 224b have been determined empirically to optimize flow of charge in the engine as further explained below. Entry port 220 is elongated and arquate in shape and has a length that is of substantially greater dimension than its width. The port is positioned such that no extremity thereof is located outside the dynamic "footprint" of the rotor 202 on end plate 206. Distribution chamber 224 is positioned adjacent port 220 and is generally kidney shaped in configuration. The inlet portion 224a always lies within the dynamic "footprint" of rotor 202, and the side port portion 224b is variously exposed to the intake portion of chamber 210 as rotor 202 rotates within housing 204. Due to the characteristics of the distribution chambers and rotor 202, the distribution chambers never communicate directly with the combustion volume of the chamber 210, and only communicate directly with the intake volume of the chamber 210 as further explained below. As mentioned above, the first inlet portion 224a of distribution chamber 224, is isolated from direct exposure to chamber 210 by flanks 215 of rotor 202, and the side port 224b is variously exposed to chamber 210 for distributing charge thereto.

In the preferred embodiment, the combined area of the entry ports 220, 232 is between 1.5 and 3 times the area of the exhaust port 212 (FIG. 3). The entry port area in square inches is about 10% of the displacement of the engine in cubic inches. The ratio of the side port area to the entry port area may be varied depending on the tuning required for the engine. In one embodiment of the present invention, the side port area is approximately twice the entry port area.

Figure 5:
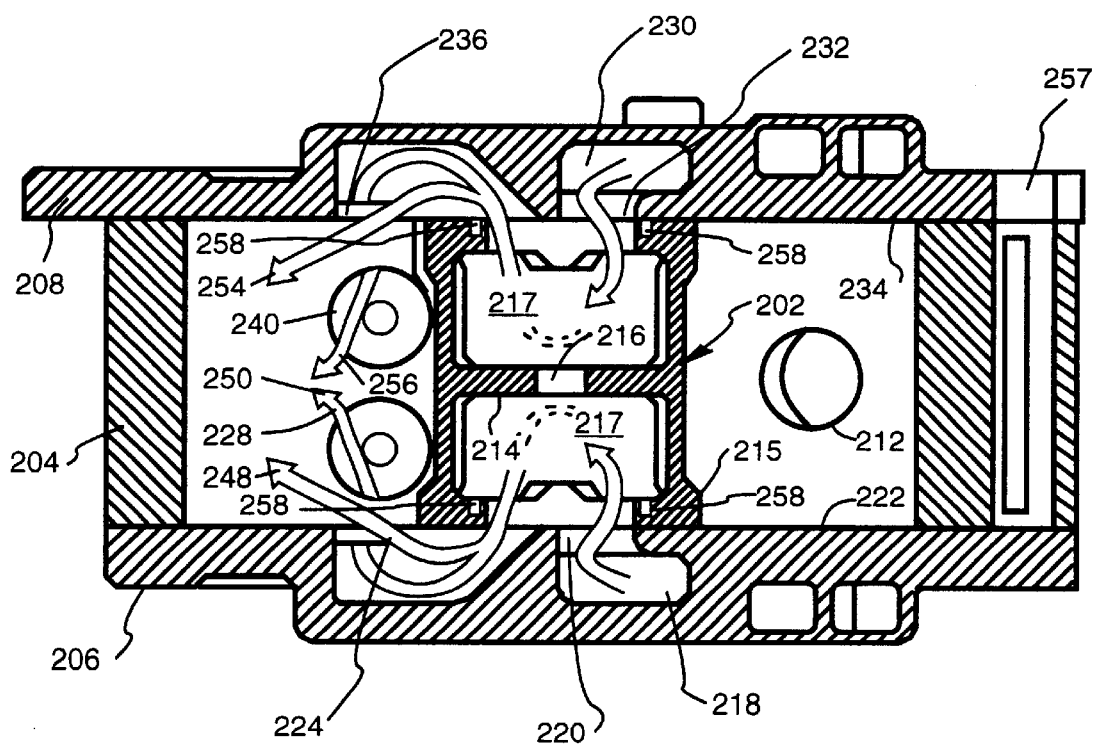
FIG. 5 is a cross sectional view of the engine of FIG. 3 taken generally along the line 5—5 of FIG. 4.

FIG. 5 is a cross sectional view of the engine assembly taken in the plane represented by line 5—5 of FIG. 4. As described above, there is substantially no flow of charge through holes 216 in web 214 of the rotor because the pressure in rotor cavities 217 will be approximately equal on both sides of the web. As described above, charge may flow from fuel/air inlet 218, to entry port 220, into and out of rotor cavity 217, and into distribution chamber 224 where some of the charge may enter the intake chamber directly (arrow 248) and some charge may enter indirectly via port 228 as indicated by arrow 250. Further as described above and depicted herein, charge may flow from fuel/air inlet 230, to entry port 232, into and out of rotor cavity 217, and into distribution chamber 236 where it likewise divides before entry into the intake chamber as indicated by arrows 254 and 256.

Rotor housing 204, first end plate 206, and second end plate 208 further include water passages shown at 257 for pumping water through the housing and end walls in order to help cool the engine. Rotor 202 includes side seals 258 for sealing the gap between the sides of the rotor and the inner walls 222 and 234 of the end plates 206 and 208.

Figure 6:
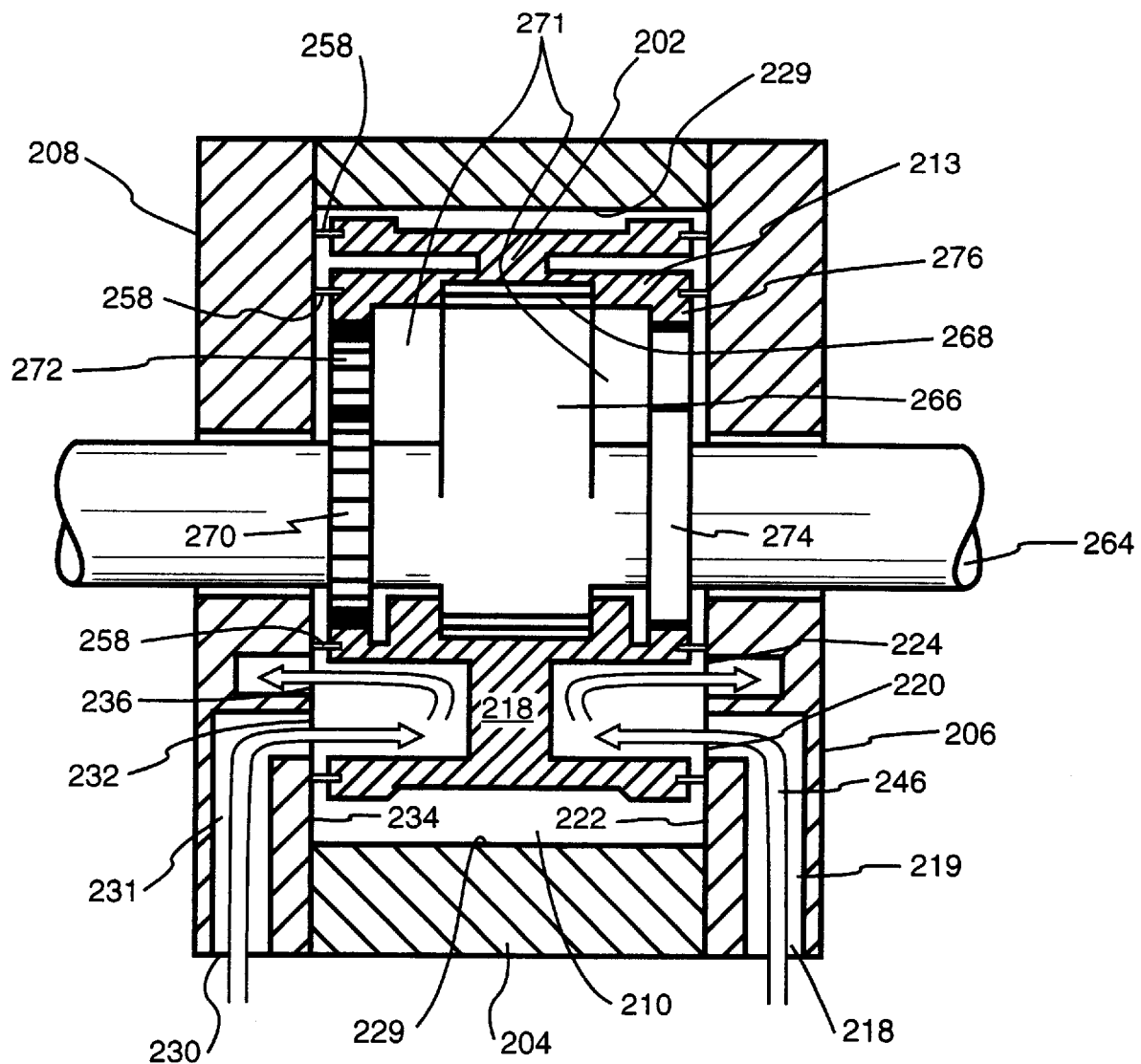
FIG. 6 is an axial cross sectional view of the engine of FIG. 3 taken generally along the line 6—6 of FIG. 4.

Turning now to FIG. 6, a cross sectional view taken in the plane represented by line 6—6 of FIG. 4 is shown. As depicted in this view, passageway 219 formed in end plate 206 provides for communication between fuel/air inlet 218 and entry port 220. In operation of the engine, and as indicated by the arrow 246, charge flows from inlet 218, through passageway 219 and entry port 220, into rotor cavity 217, and into distribution chamber 224.

Passageway 231, formed in end plate 208, likewise provides for communication of charge between fuel/air inlet 230 and entry port 232. As described above, during operation of the engine, charge flows from inlet 230, through passageway 231 and entry port 232, into rotor cavity 217, and to distribution chamber 236.

In this view, a crankshaft 264 is shown rotatably extending through chamber 210. The crankshaft is journaled to the housing by suitable bearings (not shown) as is well known in the art and includes an eccentric 266 which is rotatably mounted to rotor 202 via a rotor bearing 268 including an inner bearing race, an outer bearing race, and a plurality of roller bearing members disposed therebetween. End plate 208 includes a gear 270 which engages a gear 272 carried by rotor 202. The gear 270 has a diameter that is approximately 66.7% of the rotor gear 272. This ratio is necessary so that the apex seals (not shown) of rotor 202 trace out the precise peritrochoid shape of the closed chamber.

As is apparent in FIG. 6, when the rotor has rotated 180 degrees relative to the illustrated position, the hub 213 will overlap the entry ports 220, 224, 232, and 236 at least in part, thereby allowing charge to flow into the hub. Note that no charge passes through the hub because it is blocked by eccentric 226. However, because eccentric 266 does not abut the entry ports 220 and 232, there are longitudinal spaces 271 between eccentric 266 and the entry ports that always allow some flow of charge to occur into the spaces 271 and between the entry ports 220, 232 and distribution chambers 224 and 236. Note also that the gear 272 will partially obstruct the flow from port 232 into the adjacent space 271. This is not a problem however because the obstructed flow will usually short circuit the hub and flow directly from the entry port 232 to the second inlet port 236a of distribution chamber 236.

In order to prevent unbalanced flow of charge into both ends of the hub, a substantially equal obstruction is provided on the non-gear end of the hub in the form of a flange 274 extending transversely from the crankshaft and an annular ring 276 attached to the interior wall of hub 213.

Figure 7:
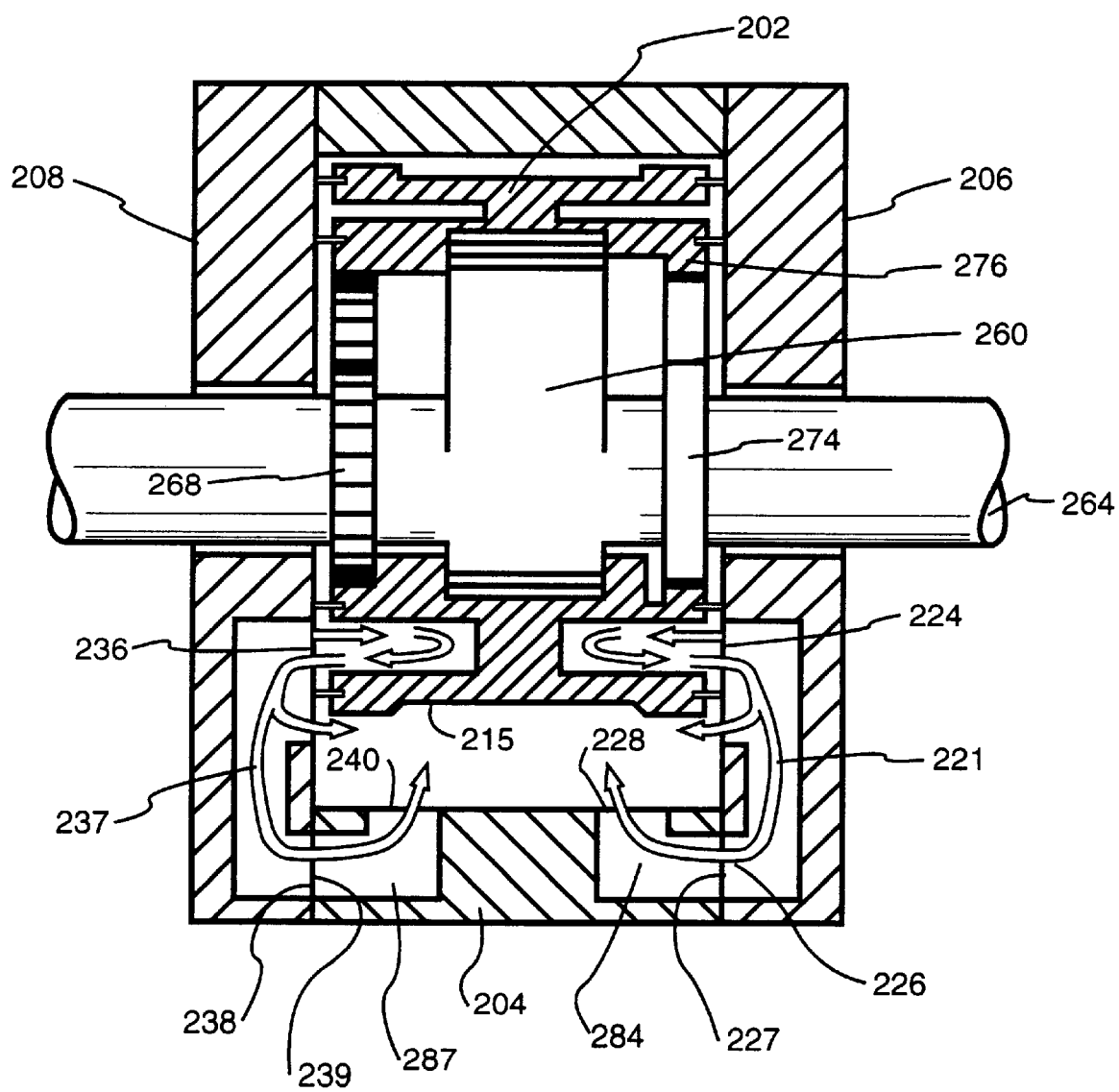
FIG. 7 is an axial cross sectional side view of the engine of FIG. 3 taken generally along the line 7—7 of FIG. 4.

FIG. 7 depicts a cross sectional view taken in the plane represented by line 7—7 of FIG. 4. Passageway 221, formed in end plate 206, provides a communicating path between distribution chamber 224 and peripheral communication port 226. A passage 284, formed in rotor housing 204, provides a communicating path between first peripheral port inlet 227 and peripheral port 228. Similarly, a passageway 237, formed in second end plate 208, provides for communication between distribution chamber 236 and peripheral communication port 238, and a passage 287, formed in rotor housing 204, provides for communication between peripheral port inlet 239 and peripheral port 240.

Figure 8:
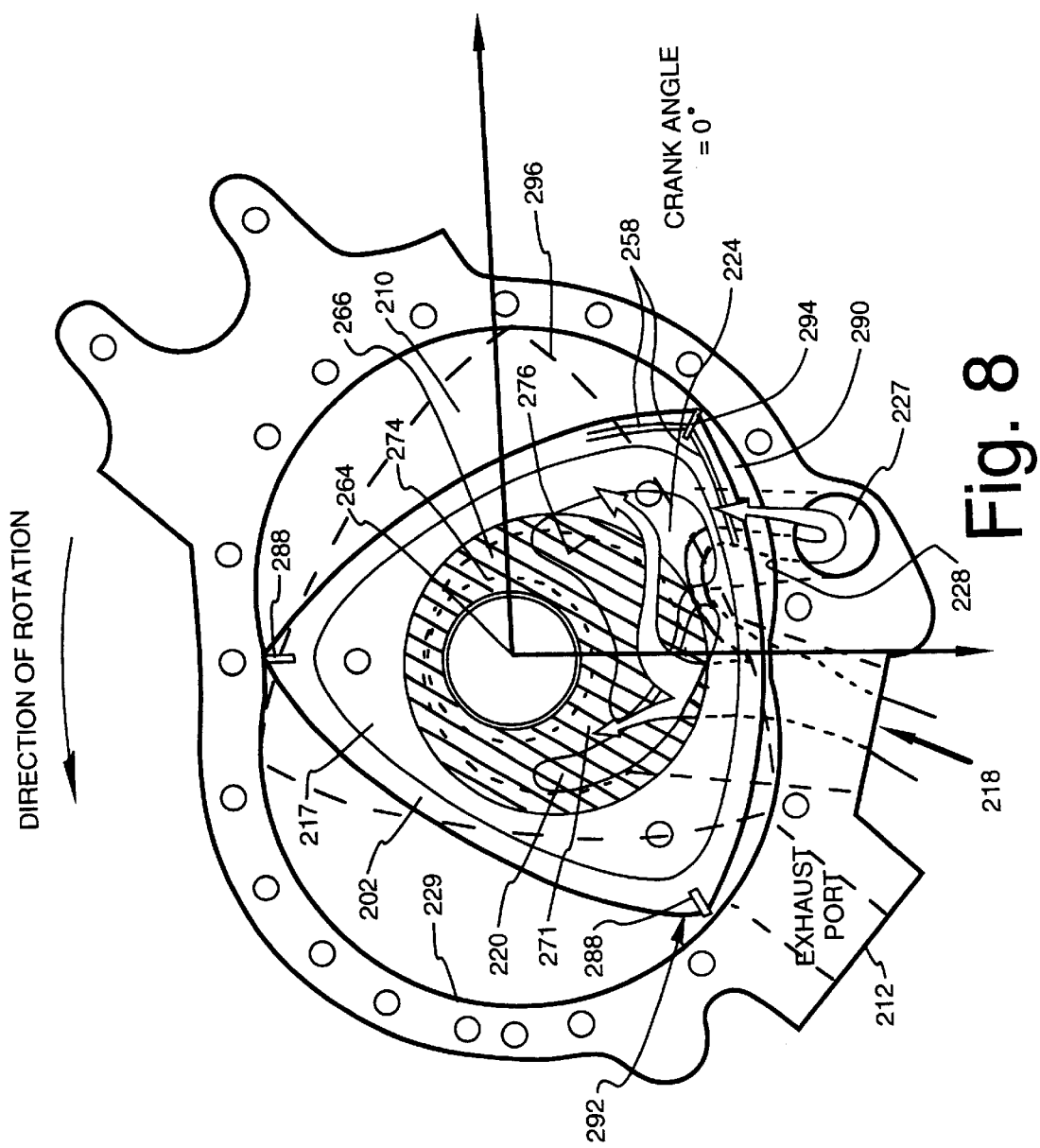
FIGS. 8–11 are transverse schematic cross sectional views of the engine of FIG. 3 showing rotor positions as it moves through a sequence of phases similar to that depicted in FIGS. 1A–1D.

FIGS. 8–11 show a series of transverse cross sectional views of the above described engine as rotor 202 rotates counterclockwise through a sequence of phases of the intake cycle. The position of the rotor may be referenced to the position of eccentric 266. FIGS. 8–11 depict generalized transverse cross sectional views of the engine looking in the direction of end plate 206 (FIG. 3). In the preferred embodiment, end plate 208 is a mirror image of end plate 206 and the following description of positional relationships of components of the illustrated end of the engine apply also to the above described components of the opposite end of the engine. As shown in FIG. 8, rotor 202 includes apex seals 288 which provide contact and sealing between each apex of the rotor and the interior wall 229 of the closed engine chamber 210.

In FIG. 8, the angular position of crankshaft 264 is at zero degrees with eccentric 266 extending downward. As shown, rotor 202 is in a position for which the intake cycle is about to begin. In theory, the intake cycle should not begin until an apex 292 of the rotor bypasses exhaust port 212. However, as further explained below, flow of charge to the intake volume 290 actually begins as soon as rotor apex 294 bypasses peripheral port 228 and intake volume 290 begins to expand.

With crankshaft 264 in this position, most of the open area of entry port 220 is obstructed from direct communication with rotor cavity 217 by hub 213. Also, most of the open area of distribution chamber 224 is blocked from direct communication with rotor cavity 217 by hub 213. Therefore, most of the incoming charge from inlet 218 flows from entry port 220 to distribution chamber 224 via the hub cavity 271, the circumscribing drive gear emulating flange 276 and shaft flange 274 being indicated by the dashed lines. In the depicted phase of the intake cycle, charge is substantially prevented from flowing from entry port 220 and side port 224b directly into intake volume 290 by side seals 258. However, charge may flow from distribution chamber 224 into the intake volume 290 via the peripheral port 228 (FIG. 3) which is in communication via passageway 227 with distribution chamber 224 as described above.

While rotor 202 is in the position shown, with exhaust port 212 and peripheral port 228 both at least partially exposed to intake volume 290, if the engine is operating at a low rotational speed (low throttle), exhaust gases could be pushed from an external exhaust system (not shown) back into intake volume 290 via exhaust port 212 while the intake volume is expanding to create a suction. The result would be that the rotary engine would run rough and misfire because of the contamination from the exhaust gas. To prevent this, peripheral intake port 228 is often shut off (by means not shown) during low throttle settings (low rpm), and then opened as the throttle is advanced.

During the depicted phase of the intake cycle, with the engine operating at higher power levels, the dynamics of the charge flow, i.e., the inertia of incoming charge through peripheral port 228 substantially prevents the exhaust gases from being pushed into the peripheral port. The peripheral port can be wide open and intake charge can begin filling the intake volume 290 even before the theoretical intake stroke begins at the point indicated by the dashed lines 296 immediately following bypass of exhaust port 212 by apex 292 of the rotor. This allows for high volumetric efficiency (volume of standard air in the intake volume 290 at maximum chamber volume (270°) vs. the chamber volume at this position). With dynamic tuning, it is possible to exceed 100%.

Figure 9:
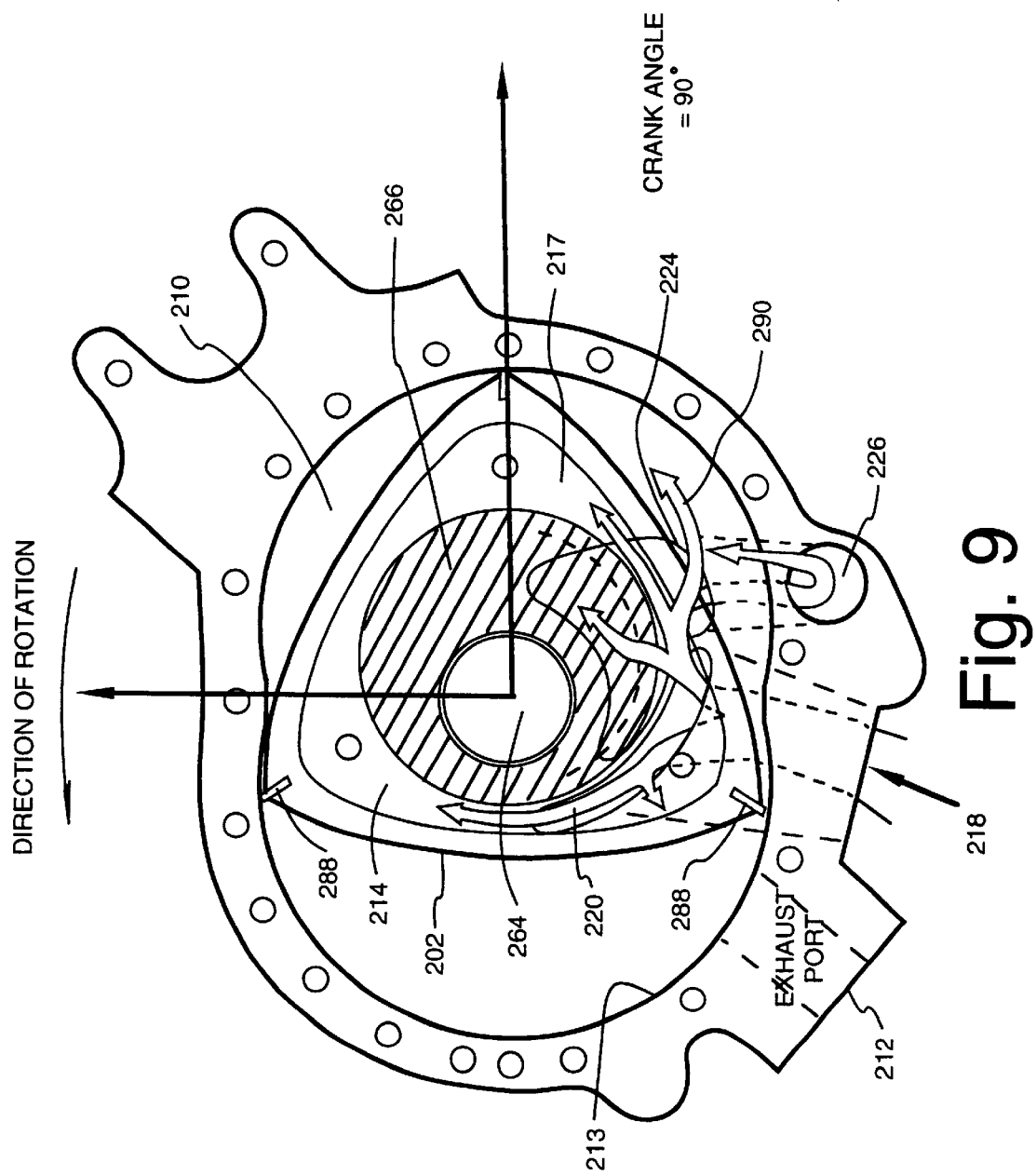

In FIG. 9, crankshaft 264 has rotated through 90 degrees and rotor 202 is in a position for which side port 224b is beginning to open beneath rotor 202 for direct communication with intake volume 290. In the depicted phase of the intake cycle, exhaust port 212 is no longer exposed to the intake volume 290.

The illustrated design allows for very free flow of charge because in effect there are two peripheral ports and two side ports. The peripheral ports dominate the incoming charge at the beginning and at the end of the cycle while the side ports contribute during the middle of the cycle. If one is interested in maximum power at high rpm then the side ports will be designed to close sooner and a precise tuning length path may be used between the entry from the side port to the entry to the intake chamber through the peripheral port. This is approximately 14 inches for the preferred embodiment at 7000 rpm and would be a similar length in most tuned rotary engines.

Figure 10:
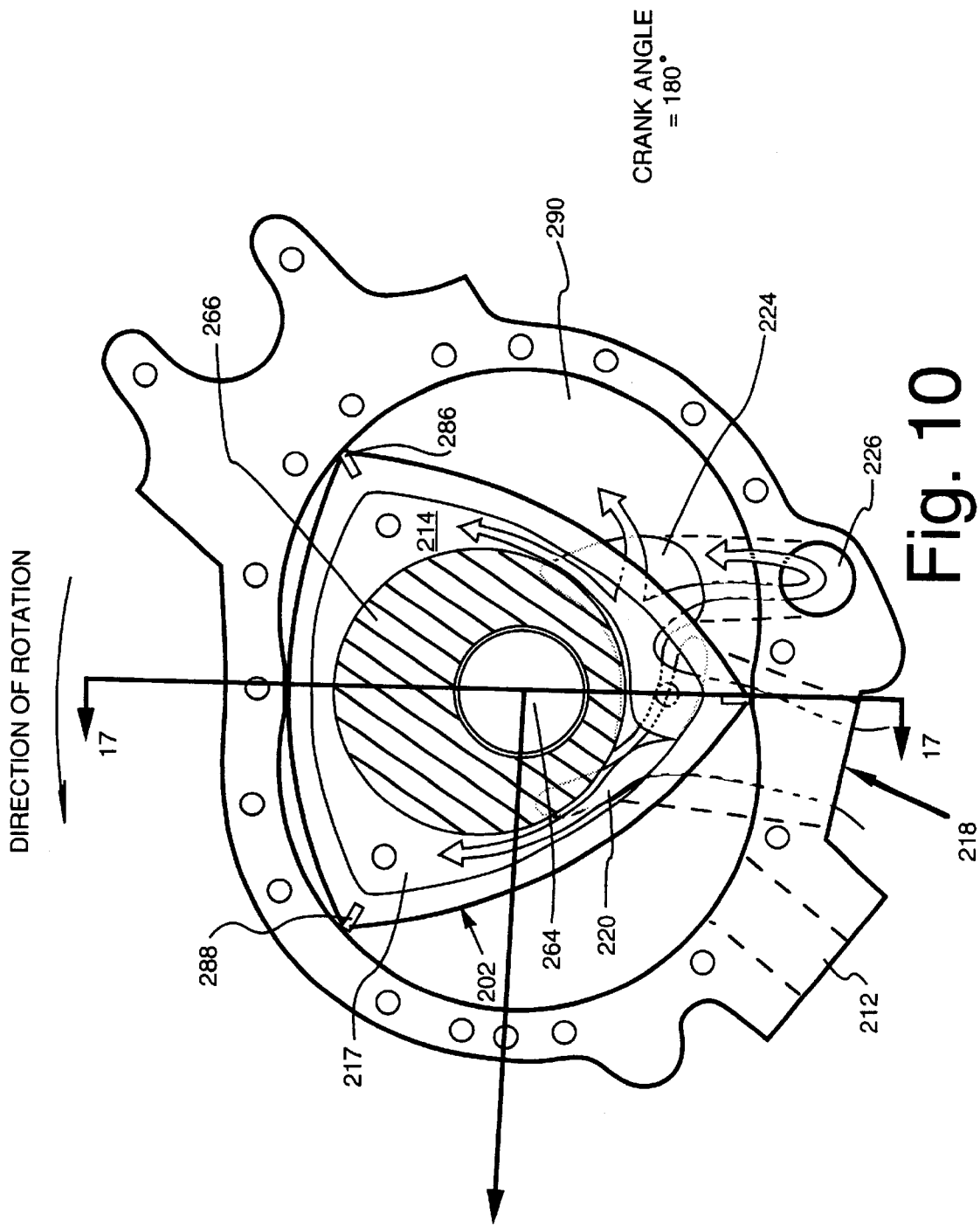

FIG. 10 shows crankshaft 264 rotated through 180 degrees and with rotor 202 in a position for which virtually all of the intake charge from inlet 218 flows to distribution chamber 224 after having passed into and out of rotor cavity 217.

One of the major operational advantages of the present invention is the elimination of side-loading on rotor 202 which may be caused by bearing thrust arising due to uneven heating of the rotor. Without a side-thrust, it is not necessary to make the ends of the hub 213 bearing surfaces ride against the end plates. Thus, these surfaces can be cut back as much as 0.1 inches. This provides additional cooling paths and, although small, they are there as needed if slight variations in the demand of charge do not match the supply. In the present embodiment, as much as a 5% decrease in back-pressure has been observed due to the availability of this additional feature.

In this phase of the intake cycle, entry port 220 is fully open to the rotor cavity 217 and maximum exit area from the rotor cavity is open to the side port 224b. This requirement accounts for the unique shapes of the entry ports and side ports and was arrived at after much experimentation. It should be kept in mind that the flow leaves from the rotor entry port 220 with a velocity and direction along the rotational axis (i.e., into and out of the paper). It then contacts the rotor I-beam web 214, does a 180 degree turn and then leaves the rotor and enters the distribution chambers. This desired flow characteristic must accommodate the fact that the rotor entry width (distance between the rotor inner face and the rotor bearing support structure) becomes quite narrow for part of the cycle and limits the rotor entry region to an area near the rotor face, hence the need for a long narrow rotor entry port. The geometric characteristics of the entry ports and side ports have been determined empirically to accomplish the specific positional relationships depicted.

Figure 11:
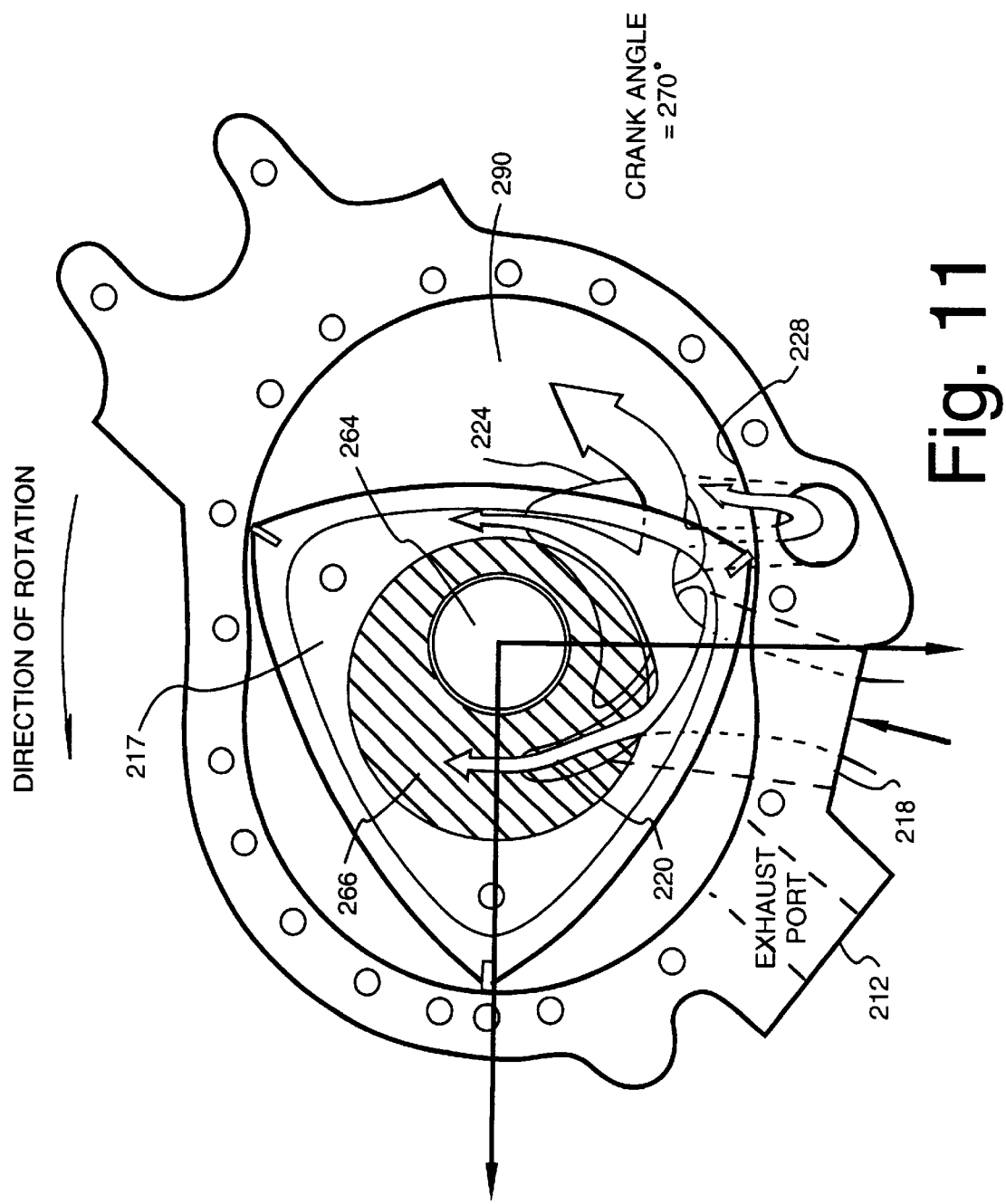

FIG. 11 shows crankshaft 264 rotated through 270 degrees and rotor 202 in a position for which the intake cycle is geometrically complete. However, due to the inertia of the intake flow (momentum of the flow), charge continues to flow into the intake chamber as indicated and thereby raises the pressure to a point above atmospheric if it is properly tuned. The side port may be designed to close before peripheral port 228 with the timing of this occurrence dependent on the tuning effect desired, i.e., the degree of importance of the peripheral port which determines maximum power available at high rotational speed (rpm) versus maximum torque available at more modest engine rpm's. It should now be appreciated that the rotor configuration and porting arrangement are importantly interdependent.

The two peripheral ports 228, 240 (FIG. 3) and two side ports 224b, 236b allow for very free flow of cooling charge in the engine of the present invention. The peripheral ports 228, 240 (FIG. 3) provide most of the flow of incoming charge to the intake volume 290 at the beginning and at the end of the intake cycle while the side ports 224b, 236b contribute flow during the middle of the intake cycle.

As crankshaft 264 rotates, as shown in FIGS. 8 through 11, the effective entry port area increases in relation to the rate of increase of the intake volume. Thus, there is no need to add a path for charge to flow through the crankshaft area or an alternate path to even out the flow of charge as is required in prior art charge cooled engines.

The flow demand is theoretically sinusoidal and therefore would be expected to reach peak flow between the phases of operation depicted in FIGS. 9 and 10 (135°). However, because of fluid dynamic inertia, the maximum flow occurs closer to the 180° position as depicted in FIG. 10 for which the engine has a maximum combined port area for flow into rotor cavity 217 and intake volume 290.

Figure 12:
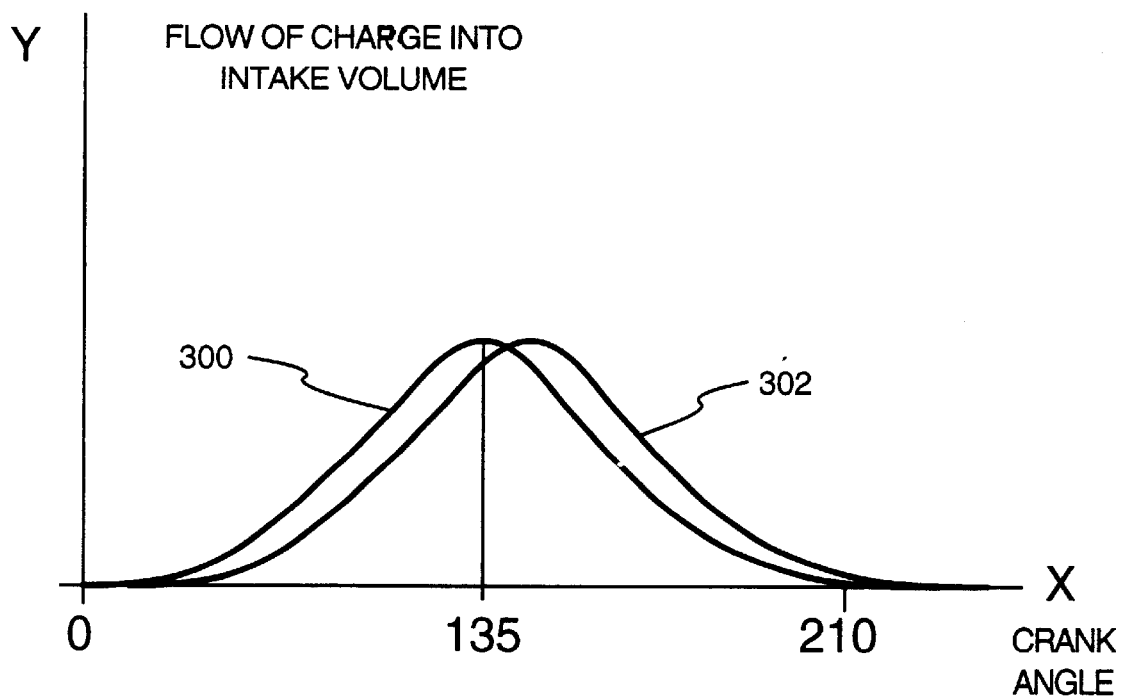
FIG. 12 illustrates a graph including curves representing flow rate of charge into an intake volume of the engine of FIG. 3 versus the angular position of the rotor at slow engine speed and high engine speed.

FIG. 12 is a graph illustrating relationships between the angular position, or crank angle, of the rotor 202 versus the flow of charge into the intake volume 290 of the closed chamber for the engine of the present invention. The angular position of the rotor is represented by the horizontal axis X. Flow of charge into the intake volume 290 (FIGS. 8–11) is represented by the vertical axis Y. The solid curve 300 represents the theoretical flow of charge into the intake volume as a function of the crank angle. The dashed curve 302 represents the actual flow of charge into the intake volume as a function of the crank angle at higher throttle levels. Both curves have a sin wave shape. In theory, there should be zero flow of charge into the intake volume when the crank angle is at zero degrees as depicted in FIG. 8. In practice, because of the flow inertia described above, the curve 302 representing the actual flow of charge into the intake volume is skewed to the right of the curve 300 representing the theoretical flow of charge into the intake volume.

Figure 13:
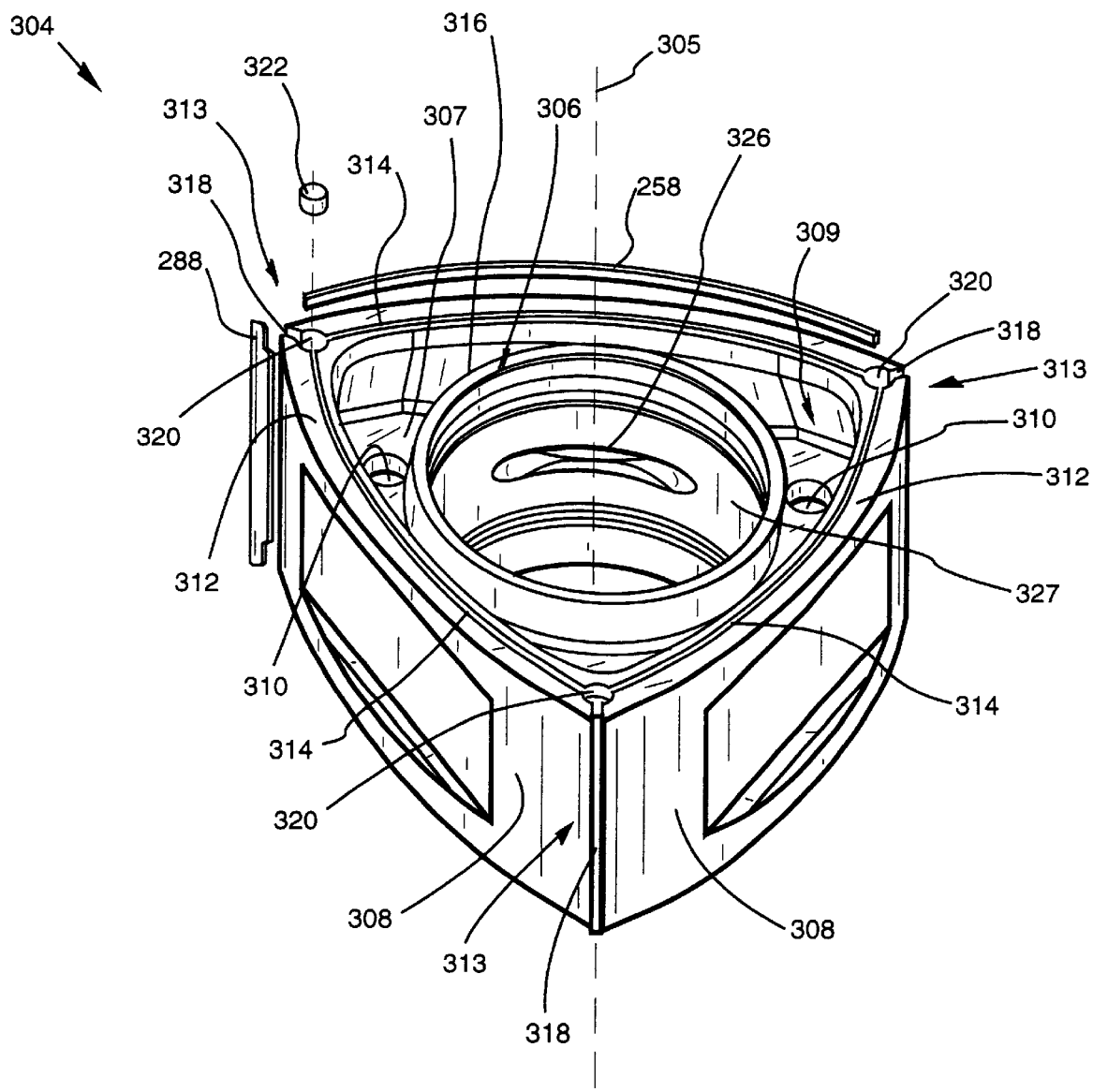
FIG. 13 is a an exploded perspective view of an alternative embodiment of a rotor design having scallops formed on an interior surface of the hub thereof.

FIG. 13 shows at 304 a perspective view of an alternative embodiment of the rotor 202 (FIG. 3) for use in a rotary engine according to the present invention. Similar to the previously described rotor, the rotor 304 includes a hub 306, a web 307, and three flanks 308 forming rotor cavities 309 on opposite ends of the rotor. Rotor 304 also has a generally I-beam cross sectional configuration and, in a preferred embodiment, is formed at least in part using a casting process. The web 307 extends transversely from the hub and joins medial portions of the rotor flanks to the hub. The rotor cavities 309 are formed on each axial end of the rotor by the hub 306, web 307, and rotor flanks 308. A plurality of through holes 310 are formed in web 307 as part of the casting process to both lighten the rotor and insure substantially equal pressure in the rotor cavities during engine operation.

Each of the three flanks 308 includes side surfaces 312 (end surfaces of the area) which are formed in a plane substantially orthogonal to the axis (305) of the rotor. Each pair of adjacent flanks 308 is joined at one of three apexes 313.

The surfaces 312 of each flank includes an elongated side slot 314 formed therein for receiving a side seal 258 for sealing the gap between the rotor end surface and the adjacent one of the interior walls 222, 234 (FIG. 6) of the end plates 206, 208 (FIG. 6) following engine assembly. Each of the side slots extends longitudinally from a first apex to a second apex. The side slots 314 are formed to have a depth less than the height of the side seals 258 so that the seals protrude slightly from the end surfaces. Appropriate seal bearing means (not shown) are provided.

The hub 306 extends axially from both sides of the web 307 and terminates in end surfaces 316 which are formed in substantially the same planes as those including the flank side surfaces 312. Therefore, in contrast with the hub 213 (FIG. 3) of the previously described rotor 202, there is generally zero offset between the end surfaces of the hub 306 and the side surfaces 312 of the flanks. Also, in contrast with the previously described hub, the end surfaces of the hub 306 do not include slots for receiving side seals. The significance of these differences is further explained herein.

Each of three apexes 313 of the rotor includes an apex slot 318 formed therein and extending the entire length of the rotor in a direction parallel to the axis 305. The apex slots are for receiving the apex seals 288 for sealing gaps between the apexes 313 and the interior wall of the rotor housing as described above.

A plurality of junction bores 320 are formed in the rotor end surfaces at positions proximate each of the apexes and at which the side slots 314 intersect a corresponding apex slot 318. The bores 320 are adapted to receive apex button plugs 322 for securing the intersecting side seals and a corresponding apex seal. The plugs limit longitudinal movement of the side seals 258 within the side slots 314, and also limit longitudinal movement of the apex seals 288 within the apex slots 318.

Because the side seals and apex seals move slightly in their respective slots, lubrication is required to reduce friction and heat generated between each of the slots and their corresponding seals. Also, because the side seals and apex seals contact and travel across surfaces including the interior walls of the end plates and the interior wall of the rotor housing, lubrication of the engaging edges of the seals is required to reduce the friction generated between the seals and contacting surfaces. Further, because thermally induced stress limits the life of a rotor, cooling of the rotor is required particularly at the apex seals. The present invention provides means for enhancing the cooling of the rotor and also provides for efficient lubrication of the seals without requiring injection of oil into the intake charge.

The charge-cooled rotary engine has historically been limited in its power output by its need to transfer sufficient heat away from the apex seals while not transferring too much heat into the rotor bearing. This delicate balance has in the past, required rotary engines to operate within narrow boundaries of RPM and HP, i.e., because heat transfer in a rotary engine is a function of rotor RPM and air-flow, it has heretofore not been possible to operate a typical charge-cooled engine at substantial power when it is rotating at low RPM where intake air flow is also lower.

Figure 14:
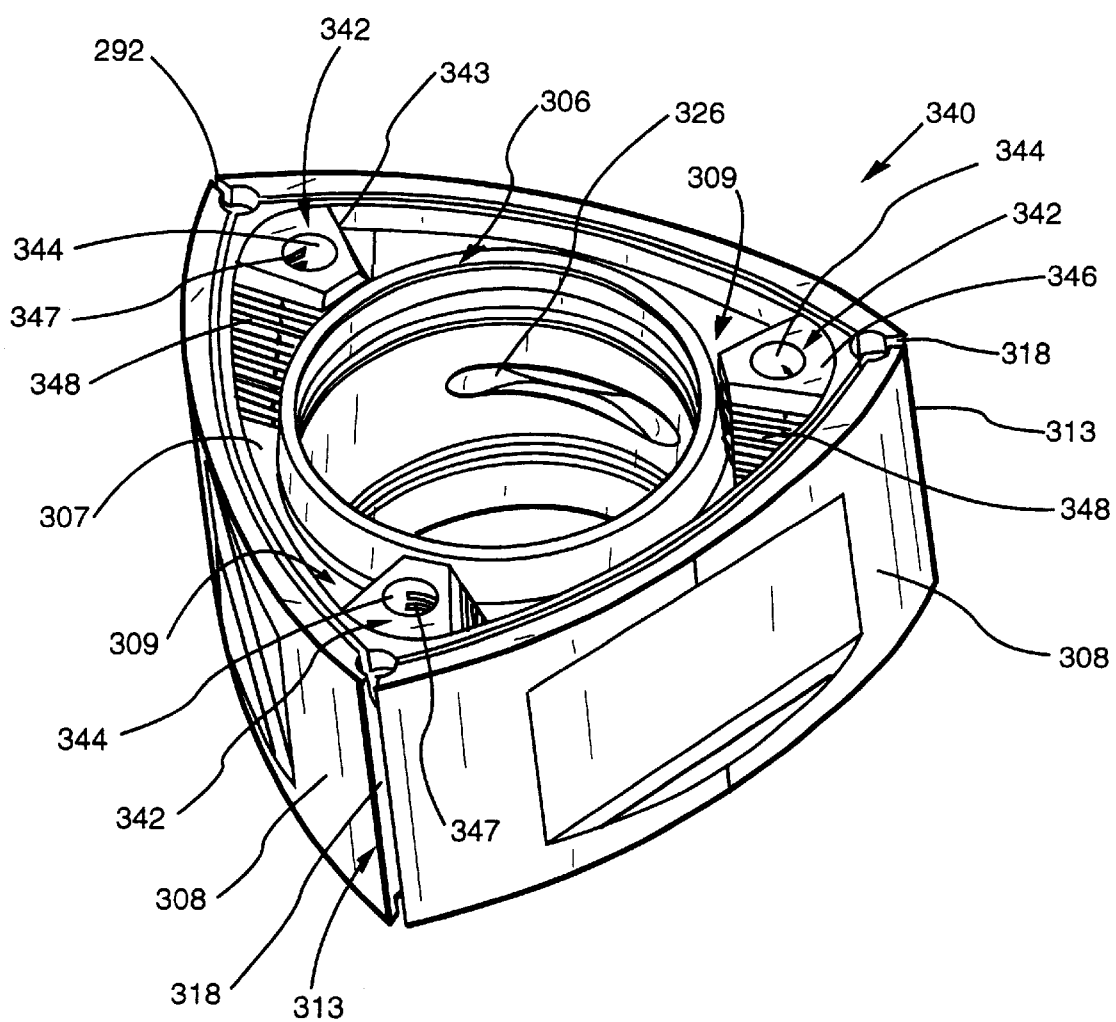
FIG. 14 is a perspective view of the rotor of FIG. 13 having in addition a plurality of heat transfer assemblies inserted into the rotor cavities proximate the rotor apexes.

However, the web-type rotor of the present invention, together with the above-described porting, provides a unique opportunity to tailor the heat transfer path and its effectiveness. One solution is to place cooling towers 342 in the cavities 309 between the rotor hub 306 and rotor flanks 308, as shown in FIG. 14. As is further described below, these tower assemblies are generally shaped somewhat like a frustrum of a pyramid such that the base is larger than the top to provide a tailored contact surface for heat transfer between the web 307 and the tower. The pyramid shape also provides minimum obstruction for the charge flow as it enters the cavity 309 on one side of the pyramid and leaves on the other after passing through the fins or plates of the tower assembly. The top of each tower includes a thicker plate 343 that is positioned in contact with the rotor flanks in the apex seal area so as to provide a direct path for the removal of heat from this critical region. The material used for the cooling towers should have a high thermo-conductivity coefficient, be light weight and resist temperatures up to 600° F. Aluminum is a good choice for this application since high structural strength at elevated temperature is not a requirement.

Figure 15:
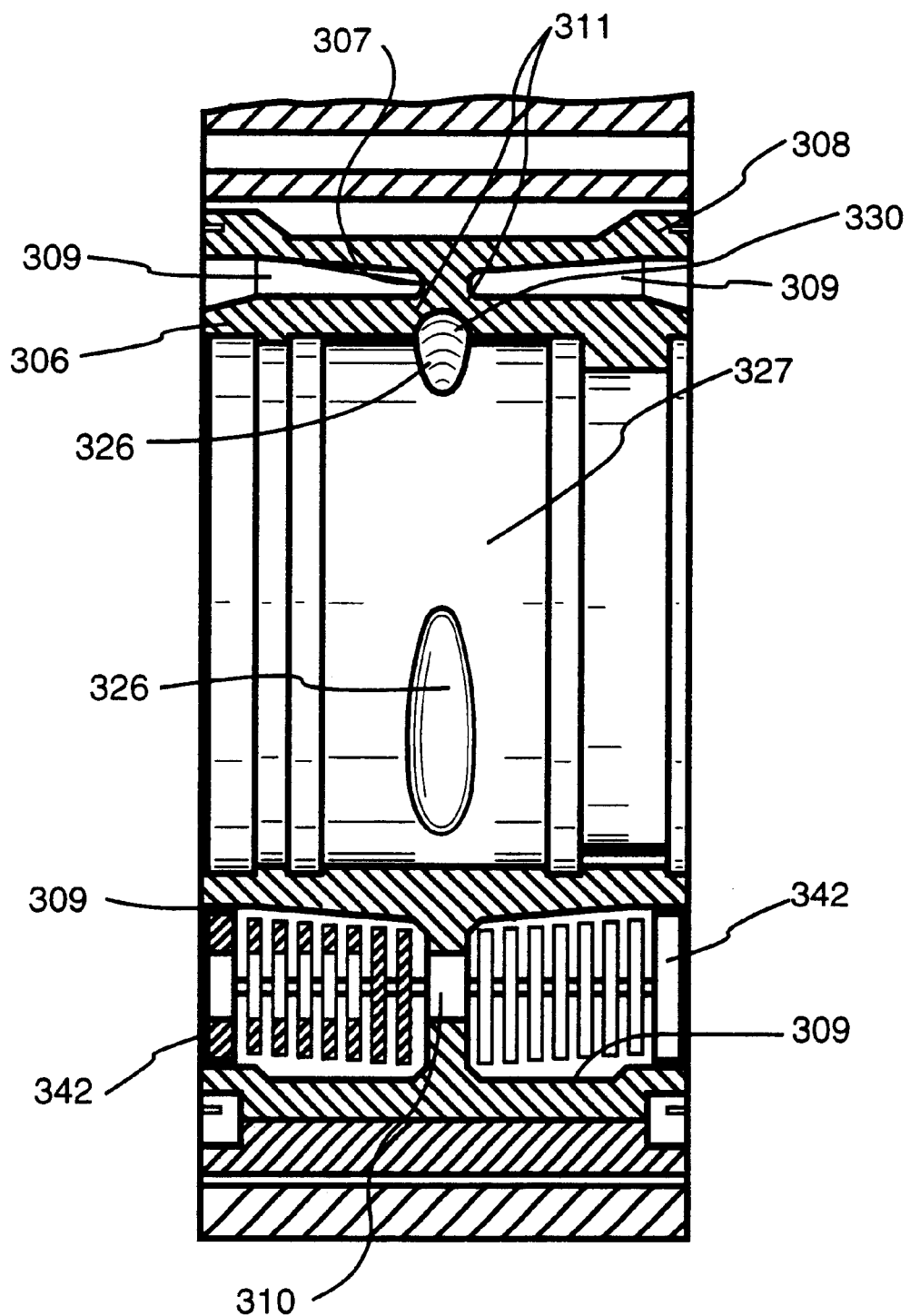
FIG. 15 is an axial cross sectional view of the rotor of FIG. 14.

With this enhanced heat transfer out of the web region in the rotor cavities, it is also possible to reduce the heat transfer in the regions where the rotor flanks 308 more closely approach the rotor hub 306 and bearing. This is accomplished by creating an air space between the rotor bearing and the hub by removing metal from the inner diameter of the hub near these critical regions. Presently, as illustrated in FIG. 15, an elongated scallop 326 of circular cross-section is created at these points on the rotor either by casting the scallop cavities in place or by machining them in a separate operation. Ideally, the scalloped cavity size is such that the temperature gradient along the flank, i.e., in the direction of the leading apex seal, is minimized. It has been found that the size of these cavities can be tailored, i.e., their depth, width, radius, and position tangentially of a simple circular cut, to achieve a fairly uniform temperature along the flanks of the rotor near the side-seals. More generally, the shape and size of these cavities can be altered to route the heat in such a manner that when matched with the shape of the tower base, a uniform temperature along the edges of the rotor flanks can be achieved. The relative depth of one of the scallops 326 is illustrated at 330. Note that each of the scallops 326 is aligned with the web portions 307 which join medial portions of the hub to the nearby medial portions of the flanks. By reducing the width of the heat transfer paths between hub 306 and web 307, as indicated at 311, heat actually transferred to those parts of the web having minimal surface area to be contacted by and thus cooled by the charge moving through the cavities 309 is reduced.

Finally, by appropriately shaping the section across the rotor (from web to each side) the surface temperature differentials can be minimized in this direction as well. As a consequence of this ability to pro-actively control the uniformity of the rotor surface temperature, thermally induced stresses can be greatly reduced. This results in a lighter rotor for a given life, or a longer life for a given rotor.

Note that tower assemblies 342 are also shown in FIG. 15 disposed in the rotor cavities 309.

Figure 16A:
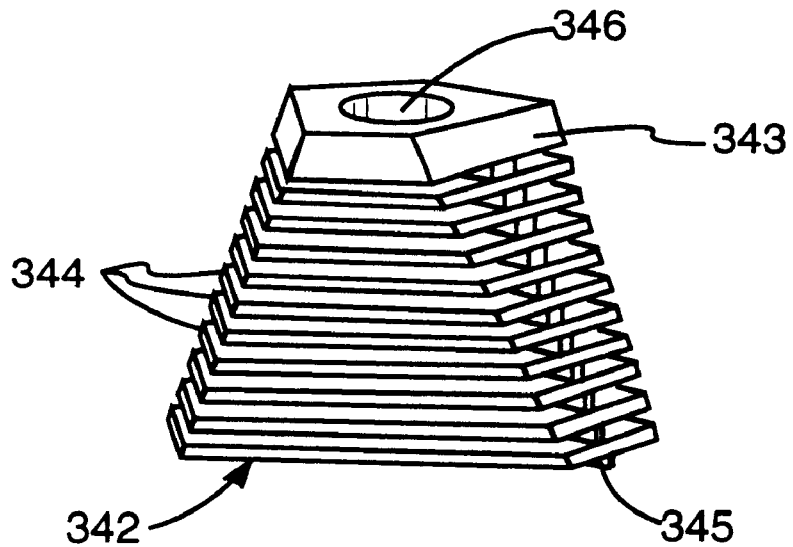
FIGS. 16A–16B are views illustrating one of the heat transfer assemblies shown in FIG. 14.
Figure 16B:
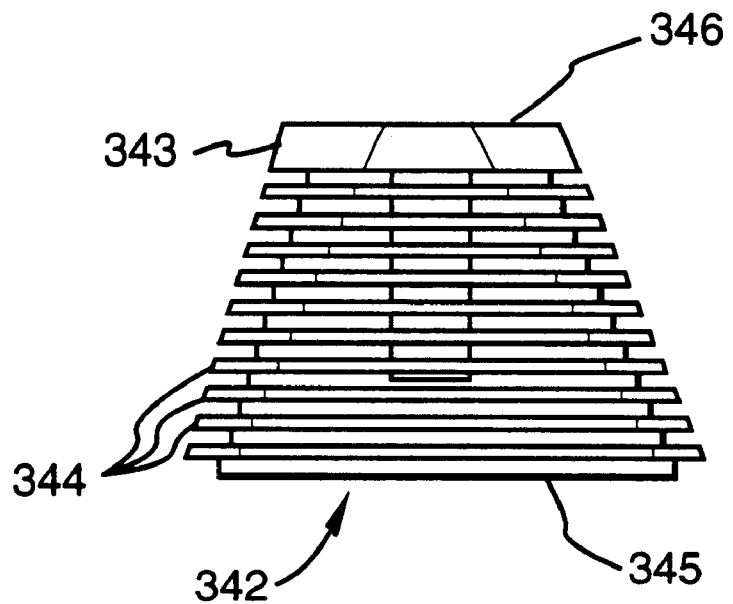

FIG. 16A is a perspective view showing one of the heat transfer tower assemblies 342 depicted in FIGS. 14 and 15. Each assembly is comprised of a relatively thick upper plate 343 and a plurality of thin horizontally extending (as depicted) plates 344 of varying sizes joined together by a vertically extending web 345 lying parallel to the side of the assembly facing the viewer. Extending down through the upper plate 343, and intersecting the web 345 and a plurality of the uppermost plates 344, is a bore 346 that provides a flow communicating passageway to the spaces between the several intersected plates 344. The web 345 and bore 346 are perhaps better illustrated in the elevational view of FIG. 6B.

Figure 17:
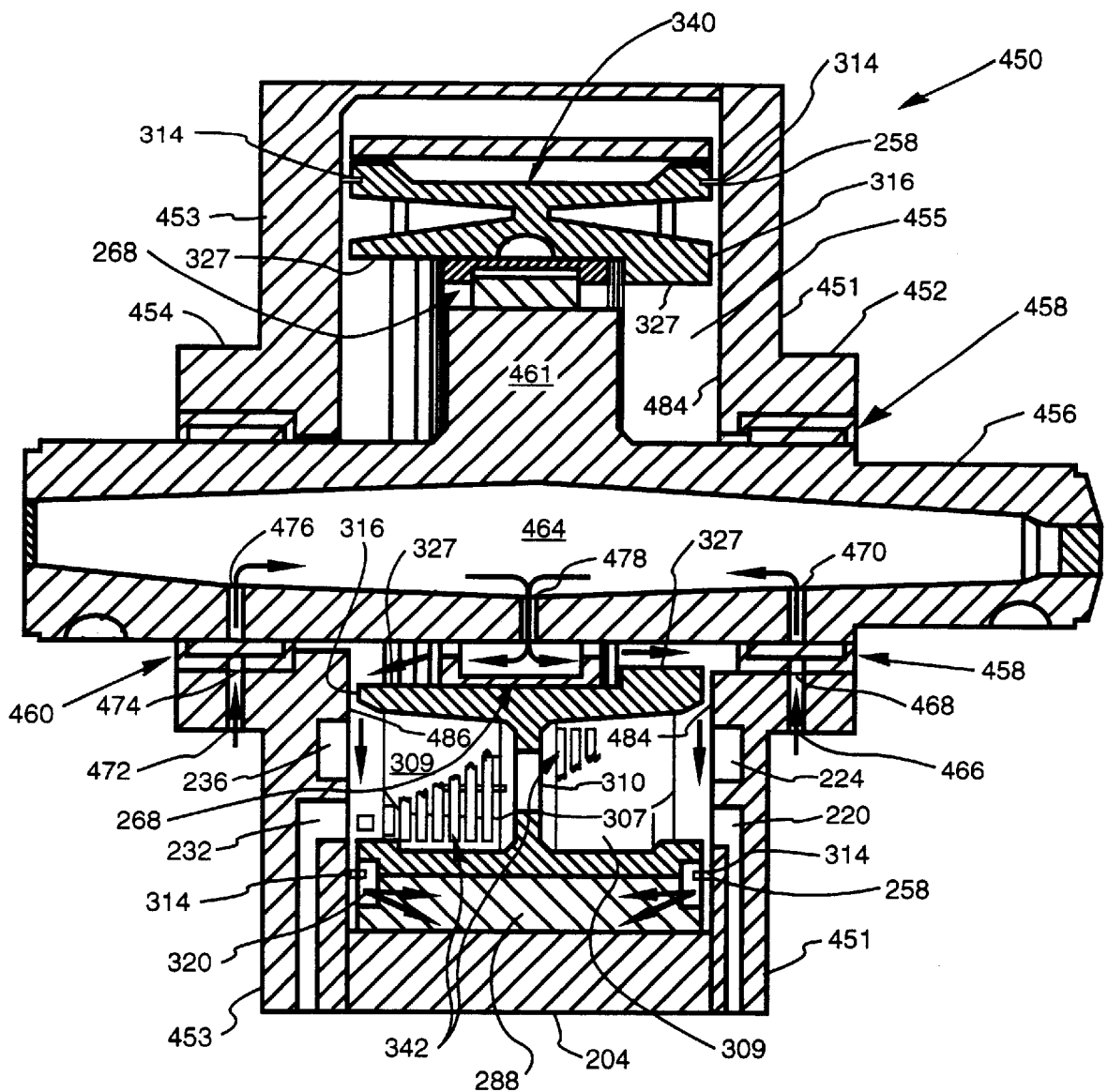
FIG. 17 is an axial cross sectional view taken generally along the lines 17—17 of FIG. 10, showing an improved lubrication system according to the present invention.

FIG. 17 shows at 450 an axial cross sectional view of an assembled engine according to the alternative embodiment of the present invention with the heat transfer assemblies shown partially broken for convenience of illustration, the view being taken generally along a line similar to line 17—17 of FIG. 10. The engine includes rotor 340, rotor housing 204, a first end plate 451 having an annular collar 452 protruding axially away from the housing 204, and a second end plate 453 having an annular flange 454 protruding in an opposite direction away from the housing. The housing and end plates define a closed chamber 455.

Similar to the first and second end plates 206 and 208 (FIG. 6), the end plates 451 and 453 include entry ports 220 and 232 which introduce the fuel/air charge to the rotor cavities, and distribution chambers 224 and 236 which collect the charge from the cavities. More specifically, charge flows from entry ports 220 and 232, opposite each end of the rotor 340, into the rotor cavities 309 toward web 307, and is then directed back toward the end plates 451 and 453 where it enters the distribution chambers 224 and 236 subject to obstruction by components in the interior of the rotor in a manner similar to that described above in reference to FIGS. 6 through 11, there being slight variations due to the use of the alternatively configured rotor 340 as further explained below. As also described above in reference to the embodiment of FIG. 6, the entry ports 220, 232 and distribution chambers 224, 236 provide a substantially balanced flow of the charge into both of the rotor cavities 309.

A rotatable crankshaft 456, shown extending through the interior chamber of housing 204, is journaled to the collar 452 of the first end plate by a first means bearing 458. The crankshaft is also journaled to the collar 454 by a second means bearing 460. The bearings 458 and 460 are both sealed at their ends and include an apertured outer bearing race and a plurality of roller bearings. An eccentric 461 of the crankshaft 456 is rotatably engaged to the rotor 340 via a rotor bearing 268 that is not sealed at its ends.

The shaft includes an axial bore 464 formed therein and extending along the longitudinal axis of the shaft from one end to the opposite end. In the depicted embodiment, the bore has a generally circular cross section which is tapered from its ends to the center of the eccentric 461 at which its cross section is largest. The shaft 456 also has a plurality of transversely extending passageways 470, 476, 478 formed therein to provide communicating flow paths to and from the bore cavity 464. As further explained below, the passageways provide means for receiving lubricant into the bore cavity from an external source, and also provide means for passing lubricant from the cavity into the rotor bearing 268.

The collar 452 has a bore 466 formed therethrough to provide communication between an external source of lubricant (not shown), and the main bearing 458. The bearing has a bore or other passageway 468 formed through its outer bearing race, the passageway 468 being aligned with the bore 466 to provide a lubricating path between the external lubricant source and the interior of the bearing. The shaft 456 likewise has one or more bores or passageways 470 formed therein to provide communication between the interior of the main bearing 458 and the bore cavity 464.

Similarly, the second collar 454 may have an opening 472 formed therethrough to provide communication between an external lubricant source and the second main bearing 460 which may also have a bore 474 formed through its outer bearing race, the bore 474 being aligned with opening 472 to provide communication between the external lubricant source and the interior of the main bearing 468. The shaft may have one or more additional bores or passageways 476 formed therein to provide communication between the interior of the second main bearing 460 and the bore cavity 464. The shaft further includes at least a third bore or other passageway 478 formed therein to provide a fluid communication path between the bore cavity 464 and the interior of the rotor bearing 268.

In operation, oil or other lubricant is injected from an external source (not shown) into the bore cavity 464 via the main bearings and the passageways 470, 474 formed in the crankshaft. As the rotor 340 rotates, centrifugal force causes the oil in the shaft cavity 464 to flow toward the shaft center and thence from the cavity into the rotor bearing 268 via the passageway 478. From the rotor bearing, lubricant is transferred along the interior surface 327 of the hub, to the end surfaces 316 thereof as the rotor is rotated. Because there is substantially zero offset between the end surfaces of the hub 306 and the side surfaces 312 of the flanks (rotor end surfaces), the gap between the hub end surfaces and the interior walls 484 and 486 of the first and second end plates is very small. Oil is thus readily transferred across the gap to the end plate surfaces as the rotor is rotated. The oil transferred to the interior walls 484 and 486 of the end plates is dispersed over a wide area of the walls because the hub sweeps across a large portion of the end plates. As the rotor side seals 258 subsequently sweep across the interior walls 484 and 486 of the end plates, oil enters the side seal slots 314 and is transported thereby toward the rotor apexes.

As described above in reference to FIG. 13, the side slots 314 of the rotor intersect the apex slots 318 via the plug bores 320. Accordingly, as the rotor rotates, centrifugal force causes oil to migrate in the side slots toward the apexes and thence into the apex slots via the plug bores. Furthermore, centrifugal force causes oil to migrate along the apex slots 318 and the apex seals 288, and ultimately onto the interior wall of the housing 204 to lubricate the sliding contact between the apex seals and the chamber walls. As oil flows from the end surfaces 316 of the hub onto the interior walls 484, 486 of the end plates 451, 453, a very small amount of oil may enter the entry ports 220, 232 and distribution ports 224, 236. However, only a very insignificant amount of oil, if any, will be mixed with the fuel/air charge flowing into the rotor cavity.

This lubrication system provides for efficient lubrication of all moving parts of the engine without requiring injection of oil into the intake charge or combustion process. Under maximum power, the engine will operate at a fuel/oil ratio of between 250 to 1 and 500 to 1. A fuel injected single rotor engine according to the present invention has been tested using a dynamometer with the engine operated at 4500 RPM and 17.8 hp. Steady-state carbon monoxide (CO) and hydrocarbon (HC) emissions were measured using a Bear Pace 100 gas analyzer, and the nitric oxide emissions were determined using a Drager Gas Pump Chemical analyzer. Fuel consumption (bsfc) was determined based on the pulse width of the fuel injector. The engine was tested using gasoline as fuel. The results of the engine tests included the following:

| | |
|---|---|
| HC | 6 ppm |
| CO | .03% |
| NO2 | 100 ppm |

The corresponding specific engine emissions (gm/bhp-hr) for the engine tested were calculated to be the following:

| | | |
|---|---|---|
| HC | .0635 gm/bhp-hr | (MW = 72) |
| CO | 1.24 gm/bhp-hr | |
| NO2 | .65 gm/bhp-hr | |

These emissions values are much lower that those for a conventional 4-cylinder, gasoline-fueled reciprocating engine, which are typically 1.6 gm/bhp-hr HC, 11 gm/bhp-hr CO, and 1.2 gm/bhp-hr NOx near the minimum bsfc operating condition.

It is also of interest to estimate the emissions that would result if the present rotary engine were used to power a generator in a series hybrid-electric vehicle. This can be done for the Federal Urban Driving Schedule (FUDS) by noting that the average speed for the cycle is 20 mph and for a 4-passenger car like the Honda Civic, simulation results indicate that the average power on the FUDS cycle is about 5 hp. This results in estimated emissions on the FUDS of 0.016 gm/mi HC, 0.31 gm/mi CO, and 0.16 gm/mi NOx without exhaust after-treatment (i.e., no catalytic converter). The corresponding ULEV standards are 0.03 gm/mi HC, 1.7 gm/mi CO, and 0.20 gm/mi NOx. Hence the engine out emissions from the present rotary engine in a series hybrid vehicle are estimated to be well below the ULEV standards. It should be noted, however, that this estimate does not include the effects of engine warm-up or on/off transients. The vehicle emissions using the rotary engine for the hybrid vehicle traveling at 60 mph, which requires about 15 hp from the generator, would be essentially the same as on the FUDS cycle.

These test results and calculations indicate that the present rotary engine has much lower engine out emissions than a typical reciprocating gasoline engine and would permit the design of a series hybrid vehicle to meet the ULEV standards with minimum exhaust after-treatment.

An engine in accordance with the present invention provides substantial advantages over a reciprocating piston engine because, like the conventional Wankel-type rotary engine, it is smaller, lighter, and less expensive to manufacture and maintain. The present engine's simple design has only three moving parts versus 51 or more for a standard automotive engine. In documented dynamometer tests, the engine produced only 1% to 4% of the emissions of an automotive piston engine with similar exhaust treatment.

An engine in accordance with the present invention also provides advantages over the only existing production rotary engine (Mazda) because it is simpler in design and includes many features which improve fuel economy and reduce pollution.

An engine in accordance with the present invention uses a composite insulating and self-lubricating coating within the combustion area to maintain complete combustion, and also uses a charge-cooled rotor that pre-heats and completely vaporizes the fuel-air mixture before it enters the combustion chamber. An engine in accordance with the present invention eliminates the need for an oil-sump and oil warm-up period, thereby reducing pollution during engine start-up. An engine in accordance with the present invention eliminates the oil pumping, seal drag, and oil cooler losses associated with an oil-cooled rotor.

An engine in accordance with the present invention may operate using essentially any fuel. Natural gas, or renewable fuels such as ethanol can be used. An engine according to the present invention is particularly suitable for powering co-generation units, which by burning inexpensive and abundant fuels, provide heat and electricity locally for lower costs than the utility companies.

An engine in accordance with the present invention generates extremely low pollution and will make the hybrid automobile a practical reality.

A small ruggedized model of the engine, designed to produce up to 30 HP and run for thousands of hours without maintenance, can drive a generator to charge a few storage batteries. The batteries provide the surge capability needed to accelerate, climb hills and recover the braking energy. Using a hybrid system together with the engine would allow cars to achieve more than 80 miles per gallon.

Many of the pumps, generators, and compressors in use today are mounted on trucks or trailers because of their size and weight. Use of the present engine instead of a large heavy reciprocating engine will allow them to become man-portable. The worldwide market for industrial and agricultural engines is approximately 40 million units annually.

In summary, an engine according to the present invention is much less polluting than other existing power plants and provides the fuel economy and quietness of a four-stroke piston engine, the simplicity and low cost of a two-stroke piston engine, and the low vibration and compactness of a turbine engine.

Although the present invention has been particularly shown and described above with reference to specific embodiments, it is anticipated that alterations and modifications thereof will no doubt become apparent to those skilled in the art. It is therefore intended that the following claims be interpreted as covering all such alterations and modifications as fall within the true spirit and scope of the invention

What I claim is:

1. A charge cooled rotary engine comprising:

a housing having an interior wall of a peritrochoidal configuration that is open at both ends, a first end plate secured to one end of the housing, and a second end plate secured to the opposite end of the housing, the housing and end plates defining a closed chamber;

an elongated shaft extending through said closed chamber and having an eccentric disposed within said closed chamber;

a rotor rotatably mounted to said shaft and in engagement with said eccentric, said rotor including three flanks forming a generally trochoidal shape, a cylindrical hub, and a web extending transversely from said hub and joining medial portions of said flanks to said hub, said web, flanks, and hub forming rotor cavities on opposite ends of said rotor, said rotor flanks serving to variously combine with said interior wall to define intake, compression, and combustion chambers;

a first inlet passageway formed in said first end plate for receiving fuel/air charge and terminating in a first entry port facing said closed chamber;

a second inlet passageway formed in said second end plate for receiving fuel/air charge and terminating in a second entry port facing said closed chamber;

a first distribution chamber formed in said first end plate contiguous with said first entry port and open to said closed chamber;

a second distribution chamber formed in said second end plate contiguous with said second entry port and open to said closed chamber;

said first and second entry ports being positioned to directly communicate with said rotor cavities and to be substantially isolated from direct communication with any of said intake, compression, and combustion chambers by said rotor flanks;

said first distribution chamber having a first inlet portion and a first side port portion, said first inlet portion being positioned to variously communicate directly with said first entry port via said rotor cavities subject to partial obstruction by said hub, said first side port portion being positioned to variously communicate directly with said intake chamber subject to partial obstruction by said rotor flanks; and said second distribution chamber having a second inlet portion and a second side port portion, said second inlet portion being positioned to variously communicate directly with said second entry port via said rotor cavities subject to partial obstruction by said hub, said second side port portion being positioned to variously communicate directly with said intake chamber subject to partial obstruction by said rotor flanks;

whereby said fuel/air charge flows into said rotor cavities via said first and second entry ports to remove heat from both ends of said rotor before flowing to said intake chamber via said distribution chambers.

2. A charge cooled rotary engine as recited in claim 1 wherein said first and second entry ports are formed by long narrow slots in said first and second end plates, said slots having a length that is substantially larger than the width thereof.

3. A charge cooled rotary engine as recited in claim 1 further comprising:

first and second peripheral ports formed in said housing and open to said intake chamber through said interior wall;

a first set of passages formed in said housing and said first end plate to provide communication between said first distribution chamber and said first peripheral port; and a second set of passages formed in said housing and said second end plate to provide communication between said second distribution chamber and said second peripheral port;

whereby said fuel/air charge additionally flows from said first and second distribution chambers to said intake chamber via said first and second peripheral ports.

4. A charge cooled rotary engine as recited in claim 1 further including rotor bearings mounted between said eccentric and said hub, said rotor bearings including an inner bearing race, an outer bearing race, and a plurality of roller bearings.

5. A charge cooled rotary engine as recited in claim 1 wherein said hub is an open cylinder having said eccentric disposed therewithin and journaled thereto midway along its axial length so as to define first and second hub cavities, the ends of said cylinder being disposed to variously overlap said entry ports and said distribution chambers, further including:

an annular rotor gear affixed to one end of said cylinder and a drive gear affixed to the surface of said first end plate, said drive gear operatively engaging said rotor gear;

said drive gear and said rotor gear variously providing a first partial obstruction of communication between said first entry port and said first distribution chamber via said first hub cavity; and means disposed at the end of said cylinder opposite said one end for providing a second partial obstruction of communication between said second distribution chamber and said second entry port via said second hub cavity, said second partial obstruction being substantially equal to said first partial obstruction.

6. A charge cooled rotary engine as recited in claim 1, wherein said web includes holes extending therethrough for equalizing pressure in said rotor cavities.

7. In a charge cooled rotary engine including a housing having an interior wall of a peritrochoidal configuration, a first end plate secured to a first end of the housing, and a second end plate secured to a second end of the housing, the housing and end plates defining a closed chamber, an elongated shaft extending through the closed chamber and having an eccentric disposed therewithin, a rotor rotatably mounted to the shaft and in engagement with said eccentric, and charge cooling means, an improved rotor comprising:

three flanks forming a generally trochoidal shape, a cylindrical hub, and a web extending transversely from said hub and joining medial portions of said flanks to said hub, said web, flanks, and hub forming rotor cavities on opposite ends of said rotor, said rotor flanks serving to variously combine with said housing to define intake, compression, and combustion chambers;

and further including an improved charge cooling means comprising a first inlet forming a passageway in said first end plate for receiving fuel/air charge and terminating in a first entry port facing said closed chamber;

a second inlet forming a passageway in said second end plate for receiving fuel/air charge and terminating in a second entry port facing said closed chamber;

a first distribution chamber formed in said first end plate contiguous with said first entry port and open to said closed chamber;

a second distribution chamber formed in said second end plate contiguous with said second entry port and open to said closed chamber;

said first and second entry ports being positioned to directly communicate with said rotor cavities and to be substantially isolated from direct communication with any of said intake, compression, and combustion chambers by said rotor flanks;

said first distribution chamber having a first inlet portion and a first side port portion, said first inlet portion being positioned to variously communicate directly with said first entry port via said rotor cavities subject to partial obstruction by said hub, said first side port portion being positioned to variously communicate directly with said intake chamber subject to partial obstruction by said rotor flanks; and said second distribution chamber having a second inlet portion and a second side port portion, said second inlet portion being positioned to variously communicate directly with said second entry port via said rotor cavities subject to partial obstruction by said hub, said second side port portion being positioned to variously communicate directly with said intake chamber subject to partial obstruction by said rotor flanks;

whereby said fuel/air charge flows into said rotor cavities via said first and second entry ports to provide equal cooling to both ends of said rotor before flowing into said intake chamber via said distribution chambers.

8. In a charge cooled rotary engine as recited in claim 7, wherein said first and second entry ports are formed by long narrow slits in said first and second end plates.

9. In a charge cooled rotary engine as recited in claim 7, further comprising:

first and second peripheral ports formed in said housing and open to said intake chamber through said interior wall;

a first set of passages formed in said housing and said first end plate to provide communication between said first distribution chamber and said first peripheral port; and a second set of passages formed in said housing and said second end plate to provide communication between said second distribution chamber and said second peripheral port;

whereby said fuel/air charge flows from said first and second distribution chambers to said intake chamber via said first and second peripheral ports.

10. In a charge cooled rotary engine as recited in claim 7, further including rotor bearings mounted between said eccentric and said hub, said rotor bearings including an inner bearing race, an outer bearing race, and a plurality of roller bearings.

11. In a charge cooled rotary engine as recited in claim 7, further including:
- a rotor gear affixed to said rotor; and
- a drive gear affixed to said first end plate between said first end plate and said eccentric, said drive gear engaging said rotor gear;
- said drive gear and said rotor gear variously providing a gear end partial obstruction of flow communication between said first entry port and said first distribution chamber via a cavity formed in one end of said hub; and
- means, disposed between said second end plate and said eccentric, for providing a non-gear end partial obstruction of flow communication between said second distribution chamber and said second entry port via a cavity formed in an opposite end of said hub, said non-gear end partial obstruction being substantially equal to said gear end partial obstruction.

12. In a charge cooled rotary engine as recited in claim 7, wherein said web includes holes extending therethrough to equalize pressure in said rotor cavities.

13. In a charge cooled rotary engine including a housing having an interior wall of a peritrochoidal configuration, a first end plate secured to a first end of the housing, and a second end plate secured to a second end of the housing, the housing and end plates defining a closed chamber, an elongated shaft extending through the closed chamber and having an eccentric disposed within the closed chamber, a rotor having rotor cavities on opposite ends thereof, the rotor being rotatably mounted to the shaft and in engagement with the eccentric, and charge cooling means, an improved charge cooling means comprising:
- a first inlet passageway formed in said first end plate for receiving fuel/air charge and terminating in a first entry port facing said closed chamber;
- a second inlet passageway formed in said second end plate for receiving fuel/air charge and terminating in a second entry port facing said closed chamber;
- a first distribution chamber formed in said first end plate contiguous with said first entry port and open to said closed chamber;
- a second distribution chamber formed in said second end plate contiguous with said second entry port and open to said closed chamber;
- said first and second entry ports being positioned to directly communicate with said rotor cavities and to be isolated from direct communication with any of said intake, compression, and combustion chambers by said rotor;
- said first distribution chamber having a first inlet portion and a first side port portion, said first inlet portion being positioned to variously communicate directly with said first entry port via said rotor cavities subject to partial obstruction by said hub, said first side port portion being positioned to variously communicate directly with said intake chamber subject to partial obstruction by said rotor flanks;
- said second distribution chamber having a second inlet portion and a second side port portion, said second inlet portion being positioned to variously communicate directly with said second entry port via said rotor cavities subject to partial obstruction by said hub, said second side port portion being positioned to variously communicate directly with said intake chamber subject to partial obstruction by said rotor flanks;
- whereby said fuel/air charge flows into said rotor cavities via said first and second entry ports to provide substantially equal cooling to both ends of said rotor before flowing to said intake chamber via said distribution chambers.

14. In a charge cooled rotary engine as recited in claim 13, wherein said first and second entry ports are formed by elongated openings in said first and second end plates.

15. In a charge cooled rotary engine as recited in claim 13, further comprising:
- first and second peripheral ports formed in said housing and open to said intake chamber;
- a first set of passages formed in said housing and said first end plate to provide communication between said first distribution chamber and said first peripheral port; and
- a second set of passages formed in said housing and said second end plate to provide communication between said second distribution chamber and said second peripheral port;
- whereby said fuel/air charge additionally flows from said first and second distribution chambers to said intake chamber via said first and second peripheral ports.

16. In a charge cooled rotary engine as recited in claim 13, further including rotor bearings for mounting between said eccentric and said rotor hub, said rotor bearings including an outer bearing race and a plurality of roller bearings.

17. In a charge cooled rotary engine as recited in claim 13, further including:
- a rotor gear attached to said rotor and a drive gear attached to said first end plate between said first end plate and said eccentric, said drive gear being disposed in engagement with said rotor gear;
- said drive gear and said rotor gear variously providing a gear end partial obstruction of communication between said first distribution chamber and said first entry port via a central cavity formed in one end of said rotor; and
- means, disposed between said second end plate and said eccentric for providing a non-gear end partial obstruction of communication between said second distribution chamber and said second entry port via a central cavity formed in an opposite end of said rotor, said non-gear end partial obstruction being substantially equal to said gear end partial obstruction.

18. In a charge cooled rotary engine as recited in claim 13, an improved rotor comprising:
- three flanks forming a generally trochoidal shape, a cylindrical hub circumscribed by said flanks, and a web extending transversely from said hub and joining medial portions of said flanks to said hub, said web, flanks, and hub forming said rotor cavities on opposite ends of said rotor, said rotor flanks serving to variously combine with said housing to define intake, compression, and combustion chambers.

19. In a charge cooled rotary engine as recited in claim 18, wherein said web includes holes extending therethrough for equalizing pressure in said rotor cavities.

* * * * *